United States Patent
Sibal

(10) Patent No.: US 10,940,457 B2
(45) Date of Patent: Mar. 9, 2021

(54) METHODS FOR USING BENTONITE TO REMOVE PESTICIDES FROM CANNABINOID EXTRACT OILS

(71) Applicant: CAPNA INC., Studio City, CA (US)

(72) Inventor: Erwin Sibal, North Hollywood, CA (US)

(73) Assignee: Capna Intellectual Property Capital, LLC, Studio City, CA (US)

( * ) Notice: Subject to any disclaimer, the term of this patent is extended or adjusted under 35 U.S.C. 154(b) by 220 days.

(21) Appl. No.: 16/151,277

(22) Filed: Oct. 3, 2018

(65) Prior Publication Data

US 2019/0099736 A1  Apr. 4, 2019

Related U.S. Application Data

(60) Provisional application No. 62/567,581, filed on Oct. 3, 2017.

(51) Int. Cl.

| | |
|---|---|
| *B01J 20/12* | (2006.01) |
| *B01D 15/30* | (2006.01) |
| *B01D 11/04* | (2006.01) |
| *B01D 17/04* | (2006.01) |
| *B01D 1/22* | (2006.01) |
| *B01D 11/02* | (2006.01) |

(52) U.S. Cl.
CPC .............. *B01J 20/12* (2013.01); *B01D 1/222* (2013.01); *B01D 11/0492* (2013.01); *B01D 15/30* (2013.01); *B01D 17/047* (2013.01); *B01D 11/0203* (2013.01); *B01D 11/0288* (2013.01); *B01D 2257/70* (2013.01); *B01D 2257/93* (2013.01)

(58) Field of Classification Search
None
See application file for complete search history.

(56) References Cited

PUBLICATIONS

Lozano-Sánchez, et al., Trends in Food Science & Technology, 21:201. (Year: 2010).*
Méndez, et al., Food Additives and Contaminants, 22:23. (Year: 2005).*
Miyahara, et al., J. Agric. Food Chem., 41:731. (Year: 1993).*
Duijn, G., Eur. J. Lipid Sci. Technol., 110:982. (Year: 2008).*
Süd-Chemie AG, Food and Feed Additives, "Tonsil®—Highly Active Bleaching Earths," pp. 1-19. (Year: 2020).*

* cited by examiner

*Primary Examiner* — Michael Barker
(74) *Attorney, Agent, or Firm* — Patnstr®, APC; Tom Brody; Peter J. Gluck, Esq.

(57) ABSTRACT

The disclosure provides methods and reagents for removing pesticides or pesticide residues from plant matter such as *cannabis* plant matter. The method uses adsorption on bentonite (bentonite scrubbing).

10 Claims, 3 Drawing Sheets

| FIGURE 1. Pressed material run to prove the silica/alumina and bentonite process works ||||||
|---|---|---|---|---|---|
| | Step 1 | Step 2 | Step 3 | | Step 4 |
| | Starting Material | Just Silica/Alumina processing w/ varying temp on distillation (120-140C | processing with bentonite, phosphoric acid and sodium hydroxide | | Processing with Step 1-3 in addition heating the solution to 70 C |
| | | *Non Ionized process* | *Ionized process* | | |
| | GSC2 | P140 | P120 | G140C | G130C | boil |
| Myclo butanil | 3.81 | | | | | |
| Paclobutrazole | 0.29 | 0.19 | 0.21 | | | |
| Permetrin | 0.11 | 0.11 | 0.1 | 0.19 | 0.14 | |
| piperonyl butoxide | 0.74 | 0.95 | 0.95 | | | |
| tebuconazole | 0.21 | 0.06 | 0.04 | | | |
| Trifloxystrobin | 4.58 | 5.42 | 5.39 | 4.42 | 4.91 | 0.17 |
| Bifenazate | 2.19 | 2.09 | 1.66 | | | |
| bifenthrin | 4.53 | 4.68 | 5.16 | 4.81 | 5.77 | |
| boscalid | 0.17 | 0.11 | 0.06 | | | |
| chlorfenapyr | 3.18 | 4.38 | 4.64 | 6.13 | 8.24 | 4.99 |
| etoxazole | 0.95 | 0.82 | 0.73 | 0.73 | 0.75 | |
| Hexythiazox II | | | 0.16 | 0.1 | 0.28 | 0.22 |

Figure 2. Pesticide analysis for phosphoric acid and sodium hydroxide efficiency

| | GS C2 | P140 | G1 40C | LG NAOH (3.0g)/50g sample | Lg phos (5ml)/50g sample | SM NAOH (3.0g)/20g sample | SM phos (5ml)/20g sample |
|---|---|---|---|---|---|---|---|
| | | *Non-ionized (not treated with NaOH and not treated with phosphoric acid)* | *Ionized* | | | *Ionized (Optimized amount of acid and bases)* | |
| Myclobutanil | 3.81 | | | | | | |
| Paclobutrazole | 0.29 | 0.19 | | | | | |
| Permetrin | 0.11 | 0.11 | 0.19 | | | | |
| piperonyl butoxide | 0.74 | 0.95 | | | | | |
| tebuconazole | 0.21 | 0.06 | | | | | |
| Trifloxystrobin | 4.58 | 5.42 | 4.42 | | | 11.58 | |
| Bifenazate | 2.19 | 2.09 | | | | 3.14 | |
| bifenthrin | 4.53 | 4.68 | 4.81 | 1.7 | 1.34 | 0.32 | 1.45 |
| boscalid | 0.17 | 0.11 | | | | | |
| chlorfenapyr | 3.18 | 4.38 | 6.13 | 5.68 | 15.94 | | |
| etoxazole | 0.95 | 0.82 | 0.73 | | | | |

| Figure 3. Efficiency of bentonite and phosphate | | | | | |
|---|---|---|---|---|---|
| | 65-STD | Bentonite | 0.5 ml P&B | 0.5ml PBNB | 5.0ml PBNB |
| Myclobutanil | 3.4 | 0.14 | | | |
| Paclobutrazole | 0.38 | 0.02 | | | |
| permetrin | 0.03 | 0.03 | 0.2 | 0.02 | |
| piperonyl butoxide | 0.5 | 0.39 | 0.2 | 0.02 | |
| Propiconazole | 0.01 | | | | |
| Tebuconazole | 0.1 | | | | |
| trifloxystrobin | 6.19 | 6.21 | 6.33 | 4.06 | |
| bifenazate | 0.32 | 0.42 | 0.45 | | |
| bifentrin | 4.23 | 4.15 | 4.15 | 3.77 | 2.89 |
| boscalid | 0.1 | 0.07 | 0.07 | 0.08 | |
| chlorfenapyr | 1.33 | 1.43 | 1.81 | 2.71 | 2.33 |
| cyflutrin | 0.16 | 0.15 | 0.13 | | |
| etoxazole | 0.22 | 0.27 | | | |
| hexythiazox | 0.15 | 0.07 | 0.07 | 0.07 | |

METHODS FOR USING BENTONITE TO REMOVE PESTICIDES FROM CANNABINOID EXTRACT OILS

CROSS REFERENCE TO RELATED APPLICATIONS

This application claims the benefit of and priority to, U.S. Provisional Patent Application Ser. No. 62/567,581, filed Oct. 3, 2017, the content of which is incorporated herein by reference herein in its entirely.

FIELD OF THE DISCLOSURE

The disclosure relates to systems and methods for removing pesticides from plant matter.

BACKGROUND

*Cannabis* is used for recreational purposes, for example, when consuming *cannabis* flowers or extracts. Also, *cannabis* finds use in medicine, for example, for relief of pain, nausea, and epilepsy (see, Clinical Decisions (2013) New Engl. J. Med. 368:866-868; Kilmer (2017) New Engl. J. Med. 376:705-707; Berkovic (2017) New Engl. J. Med. 376:2075-2076).

Plant matter, including *cannabis* plant matter, may contain contaminants such as pesticides, microbes, and heavy metal (see, Dryburgh, Bolan, Grof (2018) Br. J. Clin. Pharmacol. DOI: 10.1111/bcp.13695; Moulins, Blais, Montsion (2018) J. AOAC. DOI: 10.5740/jaoacint.17-0495). The concern for adverse health effects of pesticides in foods is evident by the fact that pesticide content is measured by a Hazard Index (HI) (see, Jensen, Petersen, Nielsen (2015) Food Chem. Toxicol. 83:300-307; Evans, Scholze (2015) Food Chem. Toxicol. 84:260-269). Pesticides are not effectively removed by ethanol extraction alone, or using butane extraction alone, or using carbon dioxide extraction alone. The present disclosure addresses the unmet need for removing pesticides from plant matter, such as *cannabis* plant matter, by novel methods that use bentonite.

SUMMARY OF THE DISCLOSURE

What is provided is methods embodiments, composition embodiments, and device embodiments. The present disclosure provides a method for removing one or more pesticides from an oil extract of plant matter, the method comprising the step of extracting the plant matter to produce an extract, the step of filtering the extract with alumina and silica to produce a filtrate, the step of mixing the filtrate with one or both of (1) A suspension of bentonite in phosphoric acid, and (2) A suspension of bentonite in sodium hydroxide (NaOH), wherein the suspension has a volume.

In another aspect, what is provided is the above method, comprising a first step of mixing with a suspension of bentonite in phosphoric acid and also comprising a second step of mixing with a suspension of bentonite in sodium hydroxide, and wherein the first step is performed before the second step. Moreover, what is provided is the above method, wherein the plant matter comprises *Cannabis sativa*.

What is contemplated is the above method, wherein the extracting of the plant matter is with one or more of hexane solvent, butane solvent, ethanol solvent, carbon dioxide, and high pressure.

What is further contemplated is the above method, wherein the phosphoric acid is added at amount that is 5 mL phosphoric acid/50 grams extract ("LG") and wherein the sodium hydroxide is added at an amount that is 3.0 grams NaOH/50 grams extract ("LG").

In yet another aspect, what is embraced is the above method, wherein the phosphoric acid is added at an amount that is 5 mL phosphoric acid/20 grams extract ("SM") and wherein the sodium hydroxide is added at an amount that is 3.0 grams NaOH/20 grams extract).

What is additionally embraced is the above method, wherein the oil extract contains residual solvent, the method comprising the step of distilling to remove the residual solvent from the oil extract.

Moreover, what is provided is the above method, wherein the phosphoric acid takes the form of a phosphoric acid solution, and wherein the sodium hydroxide takes the form of a sodium hydroxide solution, wherein the weight of bentonite, as measurable prior to adding and mixing bentonite, is about 20% of the weight of the total weight of the suspension of bentonite and phosphoric acid solution, or is about 20% of the weight of the total weight of the suspension of bentonite and sodium hydroxide solution.

Also, what is provided is the above method, wherein the phosphoric acid takes the form of a phosphoric acid solution, and wherein the sodium hydroxide takes the form of a sodium hydroxide solution, wherein the weight of bentonite, as measurable prior to adding and mixing bentonite, is about 10%, or about 15%, or about 20%, or about 25%, or about 30%, or about 35%, or about 40%, or about 45%, about 50%, or about 60%, or in the range of 10-15%, 10-20%, 10-25%, 15-20%, 15-25%, 15-30%, of the weight of the total weight of the suspension of bentonite and phosphoric acid solution, or is about 10%, or about 15%, or about 20%, or about 25%, or about 30%, or about 35%, or about 40%, or about 45%, about 50%, or about 60%, or in the range of 10-15%, 10-20%, 10-25%, 15-20%, 15-25%, 15-30%, of the weight of the total weight of the suspension of bentonite and sodium hydroxide solution.

Furthermore, what is provided is the above method, wherein the suspension of filtrate with bentonite and sodium hydroxide is held at about 70 degrees C. for about one minute. In other embodiments, this temperature can be about 50 degrees C., about 55 degrees C., about 60 degrees C., about 65 degrees C., about 70 degrees C., about 75 degrees C., about 80 degrees C., or in the range of 60-80 degrees C., 65-75 degrees C., 55-85 degrees C., and the like.

Also, what is provided is the above method, wherein the suspension of filtrate with bentonite and phosphoric acid is held at about 70 degrees for about one minute. Furthermore, what is provided is the above method, wherein the suspension of filtrate with bentonite and phosphoric acid is held at about 70 degrees C. for about one minute. In other embodiments, this temperature can be about 50 degrees C., about 55 degrees C., about 60 degrees C., about 65 degrees C., about 70 degrees C., about 75 degrees C., about 80 degrees C., or in the range of 60-80 degrees C., 65-75 degrees C., 55-85 degrees C., and the like.

COMPOSITION EMBODIMENT. In a composition embodiment, what is provided is a composition that is provided by the above method. The composition can take the form of an oil, a powder, a slurry, a paste, an emollient, a cream, a lotion, and so on. Also, what is provided is an e-cigarette, a flask, an incense, a moisturizer, a bottle, a vaporizer, that comprises a composition that is provided by the above method.

AMOUNT DEPLETION EMBODIMENTS. In a depletion embodiment, what is provided is the above method that reduces to lower than 50%, to lower than 40%, to lower than 30%, to lower than 20%, to lower than 10%, or to lower than 5%, at least one of the pesticides selected from all of Table 6, Table 7, FIG. 1, FIG. 2, and FIG. 3.

In yet another depletion embodiment, what is provided is the above method that reduces to lower than 50%, to lower than 40%, to lower than 30%, to lower than 20%, to lower than 10%, or to lower than 5%, at least two (or at least three, or at least four, or at least five) of the pesticides selected from all of Table 6, Table 7, FIG. 1, FIG. 2, and FIG. 3.

In another methods embodiment, what is provided is a method for using bentonite to remove pesticides from an initial oil extract of *cannabis*, and wherein the initial oil extract comprises pesticides, wherein the method comprises scrubbing with bentonite, wherein the method comprises the steps of: (a) Mixing the initial oil extract with water and acidic water in order to remove water-soluble material from the initial oil extract, thereby producing a processed oil extract, (b) Adjusting the processed oil extract to a pH value of less than pH 3.0 or to greater than pH 12.0 to increase ionization of nitriles or pyrrole groups or of both nitriles and pyrrole groups, (c) Mixing bentonite with the processed oil extract that had been adjusted to a pH value of less than pH 3.0 or greater than pH 12.0, (d) Allowing pesticides to adsorb to the bentonite, and (e) Separating the pesticide-depleted oil extract from the bentonite, resulting in a pesticide-depleted oil extract.

Additionally, what is provided is the above method, wherein the method comprises mixing bentonite with the processed oil extract that has been adjusted to a pH value of less than pH 3.0 in the presence of bentonite, to produce an acid-processed oil extract, followed by adjusting the acid-processed oil extract to a pH value of greater than pH 12.0 in the presence of bentonite, then removing the bentonite, to produce an alkali-processed oil extract.

Also, what is provided is the above method for using bentonite, that further comprises the step of preparing an initial oil extract of *cannabis* plant matter, wherein said step of preparing the initial oil extract is performed before performing the method for using bentonite to remove pesticides from an initial oil extract of *cannabis*, wherein the initial oil extract of *cannabis* plant matter contains one or more of cannabinoids with a carboxylic acid group, chlorophyll, tannins, protein, carbohydrates, sugars, and water-soluble alcohols, wherein said preparing the initial oil extract of *cannabis* is performed prior to conducing the bentonite scrubbing steps, wherein said preparing the initial oil extract comprises one or more of: (a) The step of heating to decarboxylate cannabinoids, (b) The step of processing on a distillation unit to raise total cannabinoid potency, (c) The step of winterization, (d) The step of filtering via a charcoal column, wherein the charcoal column is capable of removing at least some of the chlorophyll, tannins, protein, and carbohydrates present in the *cannabis* plant matter, (e) The step of removing at least some of water-soluble alcohol, wherein removal of the at least some of the water-soluble alcohol prevents interference by the water-soluble alcohol with the bentonite scrubbing, and (f) The step of removing at least some sugars, where in removal of at least some of the sugars prevents interference by the sugars with bentonite scrubbing.

Moreover, what is provided is the above method, wherein the plant matter is *cannabis* that contains cannabinoids at value of 100% prior to mixing the oil extract with water and acidic water, and wherein the oil extract that is depleted of pesticides contains at least 50% of the cannabinoids, at least 60%, at least 70%, at least 80%, at least 90%, or at least 95% of the cannabinoids.

Also, what is provided is the above method, wherein the plant matter is *cannabis* and the oil extract that is depleted of pesticides comprises cannabinoids.

Moreover, what is provided is the above method, wherein exposure of the oil extract to an extreme pH results in degradation of pesticides that contain an ester, and wherein the pesticide degradation products comprise one or more of an alcohol derivative of the pesticide, or a carboxylic acid derivative of the pesticide, wherein the method further comprises the step of mixing the oil extract that is depleted of pesticides with a silica alumina column.

Further embraced, is the above method, wherein exposure of the oil extract to an extreme pH results in degradation of pesticides that contain an ester, and wherein the pesticide degradation products comprise one or more of an alcohol derivative of the pesticide, or a carboxylic acid derivative of the pesticide, wherein the method further comprises the step of mixing the oil extract that is depleted of pesticides with a silica alumina column, wherein the pesticide that is degraded by extreme is one or more of bifenazate, spinosad, cypermetrin, permethrin, triofloxystrobin, cyflutrin, spirotetramat and piperonyl butoxide.

Additionally contemplated is the above method, wherein the oil extract comprises terpenes, cannabinoids, or both terpenes and cannabinoids. Moreover, what is provided is the above method, wherein the oil extract comprises one or more of an undesired substance that is chlorophyll, tannins, sugars, fats, extracting solvent.

In another aspect, what is provided is the above method, wherein the oil extract comprises one or more of an undesired substance that is chlorophyll, tannins, sugars, fats, or extracting solvent, wherein the initial extract contains a first amount (weight of undesired substance/weight of initial oil extract) of an undesired substance, and wherein the pesticide-depleted extract contains a second amount of the undesired substance (weight of undesired substance/weight of pesticide-depleted extract), and wherein the numerical value for the second amount is lower than 80%, lower than 60%, lower than 40%, lower than 30%, lower than 20%, lower than 10%, or lower than 5%, that the numerical value for the first amount.

COMPOSITION EMBODIMENT. In another composition embodiment, what is provided is a composition that is provided by the above method. The composition can take the form of an oil, a powder, a slurry, a paste, an emollient, a cream, a lotion, and so on. Also, what is provided is an e-cigarette, a flask, an incense, a moisturizer, a bottle, a vaporizer, that comprises a composition that is provided by the above method.

In a sugar-removing embodiment, what is provided is a method for removing sugar from an oil matrix, the method comprising providing an oil matrix that contains at least sugar, followed by the steps of: (a) Dissolving an oil matrix to homogeneity, wherein the dissolving is in an organic solvent, (b) Cooling the oil matrix to about minus 50 degrees C., (c) Filtering and collecting the filtered material which is herein called a supernatant, (d) Alkalizing the supernatant and allowing phases to develop where the developed phases include an organic phase, (e) Separating the phases, (f) A phase collection step that collects the organic hexane phase, (g) Repeating at least once the phase separation step, (h) Adding bentonite to the organic phase followed by collecting the hexane layer, (i) The step of separating the hexane from the distillate oil, (j) The step of distillation to remove any residual hexane, wherein the method is performed in the order a, b, c, d, e, f, g, h, i, j. Alternatively, what is provided is the above method that includes steps a, b, c, d, e, f, g, h, i, j, but where the order is optionally in the order of a, b, c, d, e, f, g, h, i, and j.

Also provided is the above method, wherein the dissolving is with an organic solvent that is hexane, wherein the cooling is with a cryofreezer, wherein the filtering is with a Buchner funnel, and wherein the filtering is at about minus 50 degrees C., wherein the alkalinization is by adding 5.0 M sodium hydroxide dissolved in water and allowing to mix for about 45 minutes at 2.5 kilograms of oil unit, wherein the separation step allows the phases to separate thus allowing collecting the organic phase, wherein the phase separation step is performed for a total of three times or for a total of four times, wherein for the bentonite addition step, where to the organic phase, wherein for the adding bentonite step 300 grams of bentonite are added and then the hexane layer is collected.

In another composition embodiment, what is provided is a composition that is provided by the above method. The composition can take the form of an oil, a powder, a slurry, a paste, an emollient, a cream, a lotion, and so on. Also, what is provided is an e-cigarette, a flask, an incense, a moisturizer, a bottle, a vaporizer, that comprises a composition that is provided by the above method.

AMOUNT DEPLETION EMBODIMENTS. In a depletion embodiment, what is provided is the above method that reduces to lower than 50%, to lower than 40%, to lower than 30%, to lower than 20%, to lower than 10%, or to lower than 5%, at least one of the pesticides selected from all of Table 6, Table 7, FIG. 1, FIG. 2, and FIG. 3.

In yet another depletion embodiment, what is provided is the above method that reduces to lower than 50%, to lower than 40%, to lower than 30%, to lower than 20%, to lower than 10%, or to lower than 5%, at least two (or at least three, or at least four, or at least five) of the pesticides selected from all of Table 6, Table 7, FIG. 1, FIG. 2, and FIG. 3.

SHORT DESCRIPTIONS OF THE FIGURES

FIG. 1 shows removal of pesticides from oil, in a pressed material run. The pressed material run shows efficacy of the silica/alumina and bentonite steps, for removing pesticides.

FIG. 2 shows pesticide analysis for phosphoric acid and sodium hydroxide, and efficacy in removing pesticides.

FIG. 3 shows removal of pesticides from oil.

DETAILED DESCRIPTION OF A PREFERRED EMBODIMENT

As used herein, including the appended claims, the singular forms of words such as "a," "an," and "the" include their corresponding plural references unless the context clearly dictates otherwise. All references cited herein are incorporated by reference to the same extent as if each individual patent, and published patent application, as well as figures, drawings, compact discs, and the like, was specifically and individually indicated to be incorporated by reference.

Cannabinoids

One of more of the following cannabinoids can be included in the compositions of the present disclosure. Alternatively, one of more of the following cannabinoids can be excluded (omitted) from the compositions and methods of the present disclosure. Cannabinoids and related compounds include, for example, cannabigerol; cannabichromene; cannabitriol; cannabidiol; cannabicyclolol; cannabielsoin, cannabinodiol; cannabinol; delta-8-tetrahydrocannabinol; delta-9-tetrahydrocannabinol; cannabichromanone; cannabicoumaronone; cannabicitran; 10-oxo-delta-6a10a-tetrahydrocannabinol; cannabiglendol; delta-7-isotetrahydrocannabinol; CBLVA; CBV; CBEVA-B; CBCVA; delta-9-THCVA; CBDVA; CBGVA; divarinolic acid; quercetin; kaemferol; dihydrokaempferol; dihydroquercetin; cannflavin B; isovitexin; apigenin; naringenin; eriodictyol; luteolin; orientin; cytisoside; vitexin; canniprene; 3,4'-dihydroxy-5-methoxy bibenzyl; dihydroresveratrol; 3,4'-dihydroxy-5,3'-dimethoxy-5'-isoprenyl; cannabistilbene 1; cannabistilbene 11a; cannabistilbene 11b; cannithrene 1; cannithrene 2; cannabispirone; iso-cannabispirone; cannabispirenon-A; cannabispirenone-B; cannabispiradienone; alpha-cannabispiranol; beta-cannabispiranol; acetyl-cannabispirol; 7-hydroxy-5-methoxyindan-1-spiro-cyclohexane; 5-hydroxy-7-methoxyindan-1-spiro cyclohexane; myristic acid, palmitic acid, oleic acid, stearic acid, linoleic acid, linolenic acid, arachidic acid, eicosenoic acid, behenic acid, lignoceric acid, 5,7-dihydroxyindan-1-cyclobexane; cannabispiradienone; 3,4'-dihydroxy-5-methoxybibenzyl; canniprene; cannabispirone; cannithrene I; cannithrene 2; alpha-cannabispiranol; acetyl-cannabispirol; vomifoliol; dihydrovomifoliol; beta-ionone; dihydroactinidiolide; palustrine; palustridine; plus-cannabisativine; anhydrocannabisativine; dihydroperiphylline; cannabisin-A; cannabisin-B; cannabisin-C; cannabisin-D; grossamide; cannabisin-E; cannabisin-F; cannabisin-G; and so on (see, e.g., Flores-Sanchez and Verpoorte (2008) Secondary metabolism in *cannabis* in Phytochem. Rev. DOI 10.1007/s 11101-008-9094-4).

Regarding different numbering systems for the same compound, AVIV (US 2004/0110827) states that: "It should be noted that for historical reasons, these cannabinoid analogs are still named following the previous nomenclature, where the terpenic ring was the base for the numbering system. Then the chiral centers of THC type cannabinoids were at carbon atoms 3 and 4. The accepted nomenclature is now based on the phenolic ring as the starting point for numbering. Thus, THC that was previously described as delta-1-THC was later renamed delta-9-THC, similarly delta-6-THC was renamed delta-8-THC, and the chiral centers are at carbons 6a and 10a." AVIV also has this comment about enantiomers: "delta-9-THC was established by Mechoulam R. et al. in 1967 and found to be of (−)-(3R,4R) stereochemistry. It was later found that the psychotropic activity of cannabinoids resides in the natural (3R,4R) OH series, while the opposite enantiomeric synthetic series (3S,4S) was free of these undesirable effects."

According to Chulgin, the numbering system most broadly used recognizes both the terpene nature and the aromatic nature of the two different parts of the cannabinoid. Here, the terpene is numbered from the ring carbon that carries that branched methyl group, and this is numbered 7, and the remaining three carbons of the isopropyl group are then numbered sequentially. The advantage to this numbering system is that this numbering system is applicable whether the center ring is closed or open. Other numbering systems are the biphenyl numbering system, the Chemical Abstracts system (substituted dibenzopyran numbering), and the Todd numbering system (pyran numbering) (see, Chulgin AT (1969) Recent developments in *cannabis* chemistry. J. Psychedelic Drugs. pp. 397-415.

Thermal Decarboxylation.

Thermal decarboxylation of cannabinoids, for example, delta-9-tetrahydrocannabinolic acid (THCA-A), cannabidiolic acid (DBDA), and cannabigerolic acid (CBGA) is described (see, Wang, Aula, Khan (2016) *Cannabis* and *Cannabinoid Res.* 1.1:262-271).

Diluted Phosphoric Acid Embodiments (Diluted in Water).

System, compositions, reagents, and methods of the present disclosure can use pure, reagent grade phosphoric acid, as well as pure, reagent grade phosphoric acid that occurs at various dilutions in water, preferably distilled water, deionized water, and the like. Deionized water can be prepared with EMD Millipore™ Milli-DI™ Water Purification System. The present disclosure provides diluted phosphoric acid at dilutions of 90% phosphoric acid/10% water (vol./vol.), 85% phosphoric acid/15% water (vol./vol.), 80% phosphoric acid/20% water (vol./vol.), 75% phosphoric acid/25% water (vol./vol.), 70% phosphoric acid/30% water (vol./vol.), 65% phosphoric acid/35% water (vol./vol.), 60% phosphoric acid/40% water (vol./vol.), 50% phosphoric acid/50% water (vol./vol.), 40% phosphoric acid/60% water (vol./vol.), 30% phosphoric acid/70% water (vol./vol.), 20% phosphoric acid/80% water (vol./vol.), 15% phosphoric acid/85% water (vol./vol.), 10% phosphoric acid/90% water (vol./vol.), and the like. "About" embodiments of the above values are also provided by the present disclosure.

In "range" embodiments, the present disclosure provides diluted phosphoric acid, with phosphoric acid at the indicated percent range (with the remaining percentage being water), and where the phosphoric acid percent ranges that are encompassed by the present disclosure include, 98-100%, 95-100%, 90-100%, 90-95%, 85-90%, 85-95%, 80-85%, 80-90%, 75-80%, 75-85%, 70-75%, 70-80%, 65-70%, 65-75%, 60-65%, 60-70%, 55-60%, 55-65%, 50-55%, 50-60%, 45-50%, 45-55%, 40-45%, 40-50%, 35-40%, 35-45%, 30-35%, 30-40%, 25-30%, 25-35%, 20-25%, 20-30%, 15-20%, 15-25%, 10-15%, 10-20%, 5-10%, 5-15%, and the like.

Diluted Phosphoric Acid Embodiments (Diluted in Ethanol).

System, compositions, reagents, and methods of the present disclosure can use pure, reagent grade phosphoric acid, as well as pure, reagent grade phosphoric acid that occurs at various dilutions in ethanol. The present disclosure provides diluted phosphoric acid at dilutions of 90% phosphoric acid/10% ethanol (vol./vol.), 85% phosphoric acid/15% ethanol (vol./vol.), 80% phosphoric acid/20% ethanol (vol./vol.), 75% phosphoric acid/25% ethanol (vol./vol.), 70% phosphoric acid/30% ethanol (vol./vol.), 65% phosphoric acid/35% ethanol (vol./vol.), 60% phosphoric acid/40% ethanol (vol./vol.), 50% phosphoric acid/50% ethanol (vol./vol.), 40% phosphoric acid/60% ethanol (vol./vol.), 30% phosphoric acid/70% ethanol (vol./vol.), 20% phosphoric acid/80% ethanol (vol./vol.), 15% phosphoric acid/85% ethanol (vol./vol.), 10% phosphoric acid/90% ethanol (vol./vol.), and the like. "About" embodiments of the above values are also provided by the present disclosure.

In "range" embodiments, the present disclosure provides diluted phosphoric acid, with phosphoric acid at the indicated percent range (with the remaining percentage being ethanol), and where the phosphoric acid percent ranges that are encompassed by the present disclosure include, 98-100%, 95-100%, 90-100%, 90-95%, 85-90%, 85-95%, 80-85%, 80-90%, 75-80%, 75-85%, 70-75%, 70-80%, 65-70%, 65-75%, 60-65%, 60-70%, 55-60%, 55-65%, 50-55%, 50-60%, 45-50%, 45-55%, 40-45%, 40-50%, 35-40%, 35-45%, 30-35%, 30-40%, 25-30%, 25-35%, 20-25%, 20-30%, 15-20%, 15-25%, 10-15%, 10-20%, 5-10%, 5-15%, and the like.

Media for Purifying Plant Extracts by Bulk Treatment or by Column Chromatography Sources of Oil Extract.

Without implying any limitation, an oil extract of the present disclosure is a starting material, and where the starting material is the oil that is collected during extraction. An oil extract acquired from plant matter can include one or more of the following: (1) Chlorophyll; (2) Pigments and tannins; (3) Sugars and fats; (4) Phytocannabinoids; (5) Traces of extracting solvent; (6) Pesticides.

Cannabinoids, terpenes, and a combination of cannabinoids and terpenes, can be extracted from plant matter. One method for extraction is to press it to get what is called a live resin. Other methods called liquid-solid extraction use an extracting solvent such as hexane, heptane, ethanol, butane, or carbon dioxide ($CO_2$). The use in the methods of the present disclosure, the inventor received various types of crude oil that were produced by extraction using ethanol, butane, or carbon dioxide. Also, crude oil of the present disclosure can be produced by extraction using acetone and hexane.

Forms of Bentonite.

Bentonite is available as calcium bentonite, sodium bentonite, potassium bentonite, and also in other forms. Bentonite in the form, sodium bentonite, was used for the experiments, data, and studies, used by the inventor and described herein. According to one source, "Bentonite is a clay . . . consisting predominantly of smectite minerals, usually montmorillonite. Other smectite group minerals include hectorite, saponite, beidelite and nontronite. Smectites are clay minerals, that is, they consist of individual crystallites the majority of which are greater than 2 micrometers in largest dimension. Smectite crystallites themselves are three-layer clay minerals. They consist of two tetrahedral layers and one octahedral layer. In montmorillonite tetrahedral layers consisting of [$SiO_4$]-tetrahedrons enclose the [$M(O_5,OH)$]-octahedron layer (M=and mainly Al, Mg, but Fe is also often found). The silicate layers have a slight negative charge that is compensated by exchangeable ions in the intercrystallite region. The charge is so weak that the cations (in natural form, predominantly $Ca^{2+}$, $Mg^{2+}$, or $Na^+$ ions) can be adsorbed in this region with their hydrate shell." (see, "What is Bentonite? Industrial Minerals Association North America" (IMA-NA). Washington, D.C. (information accessed on Jun. 28, 2018 from www dot ima-na dot org)). Montmorillonite has the following molecular formula: $MgNaAl_5$ $(Si_4O_{10})_3(OH)_6$ or $Al_2H_2O_{12}Si_4$ (PubChem Open Chemistry Database. PubChem CID:71586775). The above chemical formulas are exemplary and do not impose or suggest any limitation on any embodiments of the present disclosure. According to another source, bentonite contains 80% wt. montmorillonite, which has the formula, which has the formula (Si3.97A10.03) ($Al_{1.55}Fe^{3+}_{0.19}Ti_{0.005}Mg_{0.25}$) $O_{10}$ $(OH)_2$ $Na_{0.23}$ $K_{0.005}Mg_{0.01}Ca_{0.025}$ (Krall (2012) High sorption materials for SFL—A literature review. Svensk Karnbranslehantering AB, Swedish Nuclear Fuel Waste Management Co. (47 pages). Bentonite has a unit made of an alumina octahedral sheet sandwiched between two silica tetrahedral sheets.

Methods for Exchanging Cations on Bentonite.

Guidance for methods to exchange cations that are bound to bentonite or to montmorillonite is available (see, Seugling and Guth (1961) Study of the cationic exchange properties of acid activated bentonite. J. Pharm. Sci. 50:929-936).

Suppliers of bentonite and montmorillonite include, Sigma-Aldrich, St. Louis, Mo., Tierra Buena Co., Lopez Island, Wash., California Earth Minerals, Culver City, Calif.

Interactions of Bentonite with Organic Compounds.

This concerns reacting bentonite with a secondary amine to form an improved form of bentonite that is better at adsorbing pesticides that take the form of polyaromatic compounds. Without implying any limitation on the present disclosure, the following interactions can occur between bentonite and organic compounds. The following is a listing of several possible bonding mechanisms that may occur between clay and organic materials:

I. Cationic.

(1) Ion Exchange.

Organic cations are adsorbed at clay mineral surfaces by ion exchange with cations; neutralizing the negative electrical charges responsible for the cation exchange capacity of the mineral alkylammonium ions adsorbed on $Na^+$ and $Ca^{2+}$ montmorillonite, pyridinium adsorbed on montmorillonite, and butylammonium ions adsorbed on vermiculite).

(2) Protonation of Organic Molecules at Clay Surfaces.

Certain organic compounds can become cationic through protonation after adsorption at the clay surface, for example, NH adsorbed on ++2 Na- and Ca-montmorillonite, urea and various amides adsorbed on $H^+$, $Al^{2+}$, or $Fe^{2+}$, montmorillonite, pyridine +2 on Mg-montmorillonite, and 3-aminotriazole adsorbed on 4-$NH^+$-montmorillonite).

(3) Hemisalt Formation.

Hemisalt formation occurs when the amount of base adsorbed on a clay exceeds the number of protons available for cation formation (for example, ethylammonium ions adsorbed on ethylamine-montmorillonite, urea on montmorillonite, and various amides-montmorillonite complexes)

II. Anionic.

Although anions are not expected to form complexes with negatively charged clay surfaces, the benzoate anion of benzoic acid has been observed to interact with montmorillonite under certain conditions.

III. Ion-Dipole and Coordination.

Interactions between polar, but nonionic, organic molecules and clay minerals has classically been considered one of hydrogen bonding. Extensive work performed on alcohols has shown direct coordination of these organics to the exchangeable cation of the clay surface through their oxygen atoms (for example, alcohols, ketones, nitrobenzene, and amines Interacting with various clays).

IV. Hydrogen Bonding.

(1) Water Bridge.

A water bridge is formed when a polar organic molecule links to an exchangeable metal cation through a water molecule in the primary hydration shell (for example, ketones and nitrobenzene interacting with montmorillonite and acetone adsorbed on $Na^+$ and $Mg^{2+}$ montmorillonite).

(2) Organic, Organic Hydrogen Bonding.

When the exchangeable cation on the clay is an organic cation, the possibility exists of interaction with another species of organic compound through hydrogen bonding (for example, pyridinium-montmorillonite complexed with ethyl N, N-di-n-propylthiol carbamate and trimethyl-ammonium-montmorillonite interacting with dialkyl amides).

(3) Clay Mineral Oxygens and Hydroxyls.

Interaction can occur with molecules capable of hydrogen bonding with the oxygens or hydroxyls of clay mineral surfaces (for example, NH groups of alkylammonium ions complexing with oxygen of the silicate sheets in vermiculite). In most cases, the hydrogen bonds formed with the oxygens and hydroxyls on the surface are weaker than intermolecular hydrogen bonds.

V. Van Der Wals Forces.

These forces are short range, relatively weak physical forces operating between all atoms, ions, or molecules resulting from attraction between oscillating dipoles in adjacent atoms (for example, long-chain alkylammonium ions adsorbed on various minerals).

VI. Pi Bonding.

Unique d orbitals in Cu(II)-montmorillonite allow certain types of unsaturated hydrocarbons to be bound through donation of their pi electrons, for example, benzene, xylene, toluene, and chlorobenzene complexed with Cu (II)-montmorillonite).

VII. Entropy Effects.

Adsorption of some organic polymers from solution on clay minerals is apparently favored if there is a positive entropy change in the system (for example, glycine polymer adsorbed on montmorillonite).

VIII. Covalent Bonding.

Results from the inventor's laboratory indicate that it is possible in the geologic column, under relatively high pressures and temperatures and over geologic time, that some covalent bonding between organic matter and silicates may occur (for example, methyl lithium reacting with water of hydration or structural hydroxyl groups on 17 kaolinite surfaces).

To summarize, the above information provides potential interactions of bentonite with organic compounds, and taking advantage of the protonated and cation interactions. In embodiments, the methods, system, and compositions of the present disclosure can encompass one or more of the above interactions. In exclusionary embodiments, the present disclosure can exclude any reagent, composition, system, step of purification, and method, that utilizes one or more of the above interactions.

Suppliers of Reagents and Equipment

Chromatography media and columns, pumps, thermometers, mixers, chemical reagents, and the like, are available from Bio-Rad Laboratories, Hercules, Calif., Cole-Parmer, Vernon Hills, Ill., Grainger, Lake Forest, Ill., Sigma-Aldrich, St. Louis, Mo., Fisher Scientific, Pittsburgh, Pa., VWR International, Radnor, Pa. Useful labels include $^{33}P$, $^{35}S$, $^{14}C$, $^{3}H$, stable isotopes, fluorescent dyes, or fluorettes (see, e.g., Rozinov and Nolan (1998) Chem. Biol. 5:713-728). Apparatus for distilling, valves, gauges, pumps, falling film evaporators, rotary evaporators are available (see, Thermal Kinetics, Amherst, N.Y.; Hebeler Process Solutions, Tonawanda, N.Y., Fischer Scientific, Thomas Scientific, Swedesboro, N.J., SchuF Chemieventile Vertriebs, Frankfurt, Germany; G.W. Kent, Ypsilanti, Mich.; Midwest Suppliers, St. Louis Park, Minn., W.W. Grainger, Inc., Los Angeles, Calif.).

Methods, equipment, and solvents for preparing extracts of *cannabis* are available (see, Romano and Hazekamp (2013) Cannabinoids, 1:1-11; Pure Extraction (2017) Super/Subcritical. Pure Extraction, Vancouver, BC, Green Mill Supercritical, Pittsburgh, Pa.; Hazekamp (accessed July 2018) *Cannabis* Oil: What is the Best and Healthies way to Produce *Cannabis* Oil. IAM Bulletin. Int. Association for *Cannabis* Medicines). Extracts can be made using naphtha, petroleum ether, ethanol, butane, olive oil, isopropyl alcohol, propane, vegetable oil, butter, carbon dioxide, ethanol combined with carbon dioxide, acetone, and so on. In exclusionary embodiments, the present disclosure can exclude any method, crude extract, and system that uses or that was prepared with one or more of the above solvents.

The present disclosure can include, or exclude, and method that uses or any extract prepared by supercritical fluid extraction or subcritical fluid extraction.

EXAMPLES (A) Introduction to the Bentonite Methods of the Present Disclosure, with Comments on Countercurrent Partition Chromatography (CPC)

The methods of bentonite absorption and of Countercurrent Partition Chromatography (CPC) result in effective extraction of cannabinoids from *cannabis*, and result in effective removal of pesticides from a crude extract oil, as well as from other oils such as a refined *cannabis* oil extracts. The present disclosure provides methods for efficient removal of pesticide residues in extract crude oil, was well as removal from other *cannabis* oil matrices, where removal is by bentonite adsorption (Method One). As an alternative to bentonite, Countercurrent Partition Chromatography (CPC) (Method Two) can be used for pesticide removal from oil extracts.

The inventor devised the present methods for removing pesticide residue from the crude oil extract (a pre-process via distillation unit). This narrative summarizes two processes of separating the pesticide residue in the oil matrix. The first process (Method One) is chemisorption and adsorption based which facilitates adsorbing agent such as silica, alumina and bentonite in the process to trap the residues. The second process (Method Two) uses liquid-liquid separation of the residues where by the partition coefficient of the analyte are considered and is the means for separation.

In the first process, bentonite is used as the reacting medium for chemisorption mechanism where the pesticide analyte can be adsorbed chemically by allowing them to interact with the compositional matrix bentonite such as alumina, sodium and silicon. These interactions are supported by monovalent ion exchange where the removal of sodium can have an exchangeable reaction with ionizable pesticide residue when expose to various pH values. These chemical reactions are based on the pKa of each pesticide residue. Guidance for choosing conditions (the pH value) for loading, running, and eluting bentonite batch process step, or the silica alumina column, comes from the following table. The information from this table can be matched up with the pesticides that are in the plant material that needs to be processed.

Bentonite can Adsorb and Remove Anions.

The ability of bentonite to bind phosphate anions has been documented by a number of reports, including Li, Liu, Xu, Qian (2016) Environ. Res. 24:319-332; Xie, Wu, Giesy (2013) Environ. Sci. Technol. 48:582:582-590; and Chen, Wu, Liu (2018) Environmental Science Pollution Research. 25:15980-15989). Bentonite's ability to absorb anions taking the form of acids has been documented (see, Gaikar and Maiti (1996) Reactive and Functional Polymers. 31:155-164). According to Ueda et al, bentonite is a negatively charged clay that can adsorb cations and polycations. With this adsorption, "adsorption of the polycation on bentonite proceeds in a cation-exchange manner." Bentonite can also adsorb cations, as disclosed by Ueda et al, "Bentonite came to have some anion-exchange capacity as a result of adsorption of the polycation. This may be attributed to the existence of the parts of the polymer in the polymer chain which do not take part in the combination with bentonite" (see, Ueda and Harada (1968) Adsorption of cationic polysulfone on bentonite. J. Applied Polymer Science. 12:2395-2401).

Optimal pH Value of Solutions or Buffers Used for Bentonite-Mediated Removal of Pesticides.

The following discloses, for a number of chemical groups, if the group is ionized in a solution of extremely low pH or if the group is ionized at extremely high pH. These chemical groups are found some of the pesticides that are removable by the methods, systems, and reagents of the present disclosure (see, Table 1). For use in the present compositions and methods for removing pesticides, the pH value of the solution or buffer can be adjusted in order to ensure ionization of the pesticide that needs to be removed, thereby enhancing absorption by bentonite.

TABLE 1

Pesticide moieties, and ionization status in strong acid or in strong base

| | |
|---|---|
| Nitrile | Ionized in strong acid |
| Pyrrole | Ionized in strong base |
| Azole | Ionized in strong acid |
| Amino | Ionized in strong acid |
| Alcohol | Ionized in strong base |
| Nitrate | Ionized in strong base |

The silica alumina column of the present disclosure removes degradation products from pesticides. The relevant theory behind this removal is as follows. Once the cleavage of bifentrin has taken place, this creates an alcohol and an acid (usually the acid will contain the halogenated substituent), where the acid can be trapped in the acidic alumina if the acid is in its deprotonated (ionized) form (in the presence of a strong base such as sodium hydroxide) this constituent will not dissolve in hexane and it will get trapped in the silica/alumina bed.

(B) Example Two. Extracting Cannabinoids with One or More Solvents

Various methods and solvents are available for extracting cannabinoids from plants, *cannabis* plants, *cannabis* flowers, dried plants, dried *cannabis* flowers, and the like to produce a crude extract. The present disclosure provides Method One, which uses ethanol extraction followed by scrubbing with bentonite. Method Two uses Countercurrent Partition Chromatography (CPC).

For ethanol extraction process (Method One), the sample is activated into its decarboxylated form and run on the distillation unit once to raise the total cannabinoid potency from 70% to 89% which then can be feed in to both method 1 and method 2 process. For CPC (Method 2), there is no need for distillation but the material has to be activated. For both the butane and $CO_2$ extracts, the crude oil must be winterized, activated and ran on the distillation unit to raise it total cannabinoid concentration from 60% to 89%. For CPC method (Method 2) the activated oil can be run directly into it. For any other form of extraction, the crude oil must be filtered via charcoal column to remove excessive chlorophyll, tannins, protein matter, and certain carbohydrates. This is then run into a still where the total cannabinoids concentration is raised from 13-50 to 65-70%. Further step for this crude oil is to remove the sugar and water soluble alcohol prior to remediation as it will interfere with reactivity of the bentonite for Method One and the polarity of the solvent system for Method Two (CPC) which can cause deleterious effect to the outcome of the process.

(C) Example Three. Method for Cleaning the Oil Extract

Initial steps for processing oil prior to scrubbing with bentonite. The following discloses steps that need to be carried out to prevent loss of efficiency of bentonite's ability to adsorb pesticides. Bentonite reactivity can be expressed in terms of mole eq. per gram of bentonite.

Prior to bentonite scrubbing, the following needs to be carried out. What needs to be carried out is to wash the oil with deionized water to remove any water soluble matter in the oil and then wash the oil in water with citric acid. In doing so, we are removing any contaminant that contains charges which can saturate the bentonite. Steps for extraction be by one or more of the following methods, with the indicated reagents:

(A) With this process, the operator can an clean oil acquired from butane extraction;

(B) Ethanol extract (this refers to the oil collected from ethanolic extract of the plant);

(C) $CO_2$ extracted;

(D) Pressed extracted plant material.

Ethanolic extract intrinsically refers to the starting material in the stepwise process. It indicate that at this part of the step, an oil that is collected from extraction using ethanol. Each time the present disclosure refers to ethanolic extract, this refers to an oil mixture that has a residual ethanol, where this can come from two sources:

First Source:

When the operator extracts the plant material using ethanol.

Second Source:

When the operator receives a material that is extracted from $CO_2$ or butane in that they will have to be devoid from fats and other fat derivatives in a process called winterization.

When the inventor received material from $CO_2$-extracted oil, what is needed is to have it winterized, where the winterization removes fats, now the water washing is there to remove any tannin derivative constituent (which are mostly acidic) prior to addition of phosphoric acid. Deionized washing is simply removing any water soluble constituent that can posed problem in the ionization process. So again, when the present disclosure refers to an extract ($CO_2$, Ethanolic) the disclosure is referring to a starting material that is suitable for that stage of the processing.

This concerns, "Pressed extracted plant material," and discloses how "Pressed extracted plant material" relates to washing oil with deionized water and then washing with water that contains citric acid. Press extraction is a very fast process of extraction but with a troublesome crude oil outcome where the total phytocannabinoid can range between 10 to 18%. However with the process that is described in the present disclosure, the operator can clean the oil to make it devoid of pesticide.

There are two stories here, one is the water wash that is done by a centrifugal separator, where deionized water remove any water soluble constituents particularly heavy metals, phosphates, sulfates, nitrates and so forth, they second part is the water washing with citric acid which can remove phosphatides (these are the fats the forms the cell membrane of the plant). This process also remove excessive chlorophyll (that are coming directly from chloroplast—home of the chlorophyll which are highly soluble in slightly acid solution of water). These steps also remove any water soluble alkyloids that were extracted in addition to free amino acids and bases.

The operator needs to need to clean the oil to remove anything that can cause "side reactions" that may contribute to a drop in efficiency of the process. Things that can cause a drop in efficiency include, alcoholic fats and fatty acids, sapponins (glycosides and glucosides), oil soluble sugars. Things that can cause a drop in efficiency also includes, gallic acids (derivative of tannins), inorganic and organic acids and residual chlorophylls.

(D) Example Four. Bentonite Scrubbing Procedure for Removing Pesticides

Pesticides of the Present Disclosure Bind to Bentonite by Stable Ionic Binding.

The bentonite method of the present disclosure is unique in a way that pesticide residues are given the opportunity to react with the bentonite via ionic exchange mechanism and, in doing so, it makes the adsorption efficient. In general, pesticides are adsorbed to bentonite via adsorption which indicates a non-chemical interaction model such as models describe by Langmuir, which has a potential of leaching as it saturates the surface of the adsorbing media. Generally this can be seen as a process of modifying bentonite, where the modifier ion happens to be an ionizable pesticide. This process of derivatization increase the efficiency of bentonite to adsorb polycyclic compounds such as phenol and non-ionizable pesticide such as bifentrin.

Functionalization.

The present disclosure provides compositions and methods that provide "functionalization" to bentonite. Functionalization, for example, can involve a mechanism where a first compound binds to bentonite, where this creates a modified bentonite. Then what occurs second, is that this makes bentonite become better at modifying one or more types of pesticides, such as phenol and non-ionizable pesticides. Functionalization can be, for example, with an ionizable compound or with a surfactant.

Functionalization has been illustrated by the following published articles (see, Jordan J. A. (1949) Alteration of the properties of bentonite by reaction with amines. Mineralogical Magazine and Journal of the Mineralogical Society. 28:598-605; Moreno, Benavente, Gonzalez (2006) Functionalization of bentonite by intercalation with surfactants. Molecular Crystals and Liquid Crystals. 448:123-131). Functionalization with surfactants means can refer to a molecule that has the ability to interact with a hydrophobic functional group or with a hydrophilic functional group, or with both. The pesticides of the present disclosure can function as surfactants (pesticides that are added to bentonite for improving the binding properties of the bentonite).

Surfactants that can be useful for the systems, reagents, compositions, and methods of the present disclosure include, Octenidine dihydrochloride, Cetrimonium bromide (CTAB), Cetylpyridinium chloride (CPC), Benzalkonium chloride (BAC), Benzethonium chloride (BZT), Dimethyl dioctadecyl ammonium chloride. Dioctadecyl dimethyl ammonium bromide (DODAB), Narrow-range ethoxylate, Octaethylene glycol monododecyl ether, Pentaethylene glycol monododecyl ether, Nonoxynols, Triton X-100, CHAPS (3-[(3-Cholamidopropyl) dimethylammonio]-1-propanesulfonate) and cocamidopropyl hydroxysultaine, betaines such as cocamidopropyl betaine, Tween 20, Tween 40, Tween 60, Tween 80, and the like.

Another advantage of this process is reducing the possible leaching of pesticide from the bentonite improving yield for the active recollection. Since the general process is intrinsically electrostatic interaction, ion exchange interaction are more stable as long as the pH of the system is not perturbed and by transitive sense, it is a much more safer process.

Functionalization of bentonite using acid and bases, or acid only, or base only, to generate ionizable pesticide made a very successful removal of pesticide residue as depicted in FIG. 2. In FIG. 2, notice the value of non-ionized solution vs ionized solution—this experiment illustrates that the presence if acids and based to generate ionized pesticide amounts to it effective binding with bentonite (hence functionalization). The inventor used this ionic exchange interaction of amine and bentonite to increase the removal capacity, the interaction between the ionized pesticide and bentonite is what the inventor coined the term functionalization as described herein. Functionalization of bentonite is described in the publication, "Functionalization of Bentonite" by Interaction With Surfactants," by Moreno, Benavente, Gonzalez, Lavayen, and Torres. This publication states that surfactant can be adsorb in bentonite. FIG. 2 also indicate that the removal of pesticide at higher pH induces the adsorption of pesticide residue in bentonite. The point here, is that by ionizing the pesticide (which is the azole groups of the pesticide) efficiently displaces sodium from the bentonite.

Just for clarification on this mechanism, the inventor points out bifenazate. Bifenazate has a pKa of 12.94 which means if this analyte would be dissolved in acidic solution you will generate an ammonium ion which can be adsorb in the bentonite where if you add sodium hydroxide in the solution nothing will happen. This is illustrate in FIG. 2, for bifenazate in NaOH solution the tested amount of pesticide is similar to that of the starting material but in phosphoric acid no bifenazate is detected. Bifenazate pKa=12.94 at 23 degrees C. (see, Compound Summary for PubChem CID: 176879 at PubChem Open Chemistry Database).

FIG. 2 illustrates that functionalizing bentonite improves the removal of pesticide in the hexane/oil mixture from GSC2. It should be noted that comparing non-ionized solution to ionized solution the degree of removal is substantial. It should be noted that grayed out cell indicate that the pesticide residue was not detected in the samples. All sample test were conducted by the third party testing. In FIG. 2, the word "sample" refers to the distillate oil sample that the inventor used for the analysis. In FIG. 2, the inventor used two different weights systems (20 grams and 50 grams). The sample description is as follows. It is a *cannabis* oil distillate that had been processed through distillation.

FIG. 2 under bifenazate removal, provides data that are sufficient enough to display that the pH of solution affects the affinity of the residue in the bentonite. The inventor observed that the removal (adsorption) is higher in acidic solution. This demonstrates that the production of the ions at low pH increase its affinity to bentonite.

Additional Details Concerning FIG. 1.

This explains the units for the numbers in FIG. 1, that is, for the table that appears in FIG. 1. The units here are all ppm (mg/ml) all testing here were done via *cannabis* industry license testing facility and they use ppm. The following describes how the numbers in the table demonstrate that the pesticide is being removed. Note the pesticide residues that are the subject of the inventor's purification process are the following: Myclobutanil; Paclobutrazole; Permetrin; Propionyl butoxide; Bifanazate; Boscalid; Etoxazole (some material will have bifentrin and tryfloxystrobin but not common).

For etoxazole, the numbers are 0.95, 0.82, 0.73, 0.73, and 0.75. These numbers are Parts Per Million (ppm) values. These values were gathered from the analytical testing of oil samples. These values show that the pesticide is getting removed.

The starting material has a value of 0.95 and at the last step, the value is 0.75. This shows that the etoxazole is being removed. For trifloxystrobin, the row of numbers is 4.58, 5.42, 5.39, 4.42, 4.91, and 0.17. For trifloxystrobin, the number went from 4.91 to 0.17 in the last step. The unit of all these numbers are in ppm (part per million or mg/kg). Where a cell in a table is empty, then there were no pesticide detected.

In FIG. 1, the inventor wants to depict those result as the result that were gathered during the method development where showing each stages that was done at different dates (this is essential because it did took the inventors some time to devise the method but the inventor did use the same sample for all of them). The value for trifloxystrobin 4.91 and 0.17 can be both depicted as follows. In step 3 (4.91) this was the first time that the inventors incorporated bentonite in the process, prior to this point we were just focus on acquiring specialized type of silica and alumina (at this point, the methods were not working optimally, because the laboratory results were only removing some pesticides and it had to be done with large volume of bed) at this stage sodium hydroxide and phosphoric acid were just aiding reagent for silica and alumina filtration (please note that the silica that was used on this were acid and alumina also is acidic). At Step 4 (0.17), the inventor started incorporating the pKa values of the pesticide thinking that if the inventor can change the solubility of pesticide in the hexane/oil mixture, the inventor can ionized it and change its interaction with bentonite (interaction went from Van der Waals to ion exchange hence more effective and selective). Once this was set up and the inventor had an understanding of the chemistry that goes on in the process, the inventor went on and determined the concentration and amount of acid, base and bentonite that was needed to increase the efficiency of the process (which is depicted in FIG. 3—where all experiment were done in one day to provide a proper side by side studies. The following concerns the question of, why haven't you remove silica and alumina filtration now that you know bentonite can do the job, bentonite is a very fine particle and it have to be filtered, silica/alumina bed do a great job at that, in addition we can filter of some of the tannin metabolites that can yield a colorless product or a very light yellow which is good for *cannabis* oil. Furthermore, in FIG. 3 (see, table in FIG. 3) this is where we set the mixing time and how the acid and base is added to achieve homogeneity in the solution.

Additional Details Concerning FIG. 2

For bifenthrin, the following reveals the relation between the number 4.53 and the number 4.68. This value essentially illustrate that without ionizing the pesticide, the removal does not occur. Notice in FIG. 1, P140 is the sample that was process by simple filtration using silica and alumina, at temperature 140 during distillation (it should be noted that after the process, distillation of the material is essential to remove any residual hexane—which is listed as class 3 residual solvent). This value really takes in the information that ionization of the hexane/oil allows the pesticide residue to attached to the bentonite.

For bifenthrin, the following reveals the relation between the number 4.53 and the number 4.81. This sample illustrates the initial result of the acid, base and bentonite incorporation in the result, which is then further optimized in terms of the amount of the bentonite, acid and base needed to increase the efficiency of the process as seen on successive experiment (LG NAOH and LG phos).

For bifenthrin, the following explains the relation between the number 4.53 and the number 1.7. This is the experiment where the inventors looked at the effect of the amount of phosphoric acid in the process of the removal. Once the base and the acid were added in the process at higher concentration, most of the pesticide that were present in G140C were almost remove where the amount of bifentrin in the oil mixture start to decrease substantially.

To view the big picture, in table 1, this is the illustration of the efficiency of each step that is done in reverse, starting with filtration using silica/alumina, incorporation of acid, base and bentonite and finally incorporation of the heating process and optimization of the amount of acid and base, now in the method that the inventor submitted to you the general pathway for the processing is as follows:

(1) dissolving the *cannabis* oil mixture in hexane and homogenized with phosphoric acid.

(2) after the homogenization the bentonite is added and allow to mix at 70 C (when pesticide such as tryfloxystrobin, bifenazate and bifentrin are present), once the mixing is finish, bentonite is separated.

(3) addition of sodium hydroxide to homogeneity at constant heating to 70 C (when pesticide such as trifloxystrobin, bifenazate and bifentrin are present) which is followed by the separation of bentonite (4) the filtration of the hexane/oil mixture in the silica/alumina media.

(5) distillation to remove residual hexane.

In table 1, step 1 shows just simply the starting material (regarding this point, the inventor emphasizes that GSC2 is the sample used) in step 2 this is where the sample is simply filtered in alumina and silica and no bentonite, acid and base added. P140 and P120 illustrates the temperature set up the run where the distillation process is done in two different temperature settings (the inventor incorporates this temperature strictly for distillation run—the goal here is optimizing the parameter that the sample needs to be run and one of the parameter that i need to illustrate is the color of the distilled oil and the speed of distillation, both of those parameter is directly affected by the temperature of the still body). Step 3 (note below it says ionized process) this is the step of the experiment where bentonite, acid and base are added in the processing step (G140C and G130 the label added the temperature of the still- to again, find the right temperature for the efficiency of distillation process). At this stage, the volume and weight of the bases and acid were not yet optimized but the amount of bentonite to be used was optimized (which is at 15%—bet 10-20% depending on the color of the distillate oil), finally at step 4, this is one of the experiment that we used where more of the acid and base added to the mixture, so essentially this experiment was built backwards that is why the result and the illustration is set backwards.

The following concerns bifenthrin, and explains the relation between the number 4.53 and the number 1.34. Again this stage of the experiment were to illustrate what stage of the method development we found that the amount of phosphoric acid and sodium hydroxide needed to clean the material (LG refers to the sample size 50 g instead of 20 g)

For bifenthrin, the following explains the relation between the number 4.53 and the number 0.32. This is now the stage in which we know that increasing the amount of acid and base can really scrub bifentrin (note that bifentrin is a potentially challenging one to remove from the oil mixture because it does not have any Nitrogen that can be ionized easily) bifentrin requires a much stronger ionic strength than the others.

For bifenthrin, the following explains the relation between the number 4.53 and the number 1.45. Now this step really is to illustrate what is the effect of sodium hydroxide independent from phosphoric acid and we found that in the presence of sodium hydroxide much higher concentration of bifentrin is remove from the hexane/oil mixture and there is a mechanism that actually facilitate this removal and one of them is the decomposition rate of bifentrin in the presence of sodium hydroxide than in phosphoric acid. When there is enough sodium hydroxide in the solution more bifentrin can be remove. Additionally, on our current method the inventor does screen for each pesticide before we do the process so we know how the *cannabis* oil to be process, each step of the process could have a negative effect on the material, for example, more sodium hydroxide can affect the color of the final oil distillate so we try to illustrate this need by need basis to get the method efficiency.

The following explains which numbers are connected to each other (for example, as showing pesticide level in starting material, and pesticide level after processing in a given step). The following explanation makes use of sample names. GSC2 is the starting material, P140 is the process where no acid, no base and no bentonite is added, this is just to illustrate that acid and base really do the trick in removing pesticide. G140 this is the sample were the bentonite was incorporated with small amount of acid and base to get the baseline for acid and base effect on the color of the final product (0.1 ml phosphoric acid and 0.1 g of sodium hydroxide is added to a 50 g *cannabis* oil sample. LG NAOH is the sample that was run using only sodium hydroxide and bentonite in addition to filtration in silica and alumina. This experiment helped us understand chlorfenapyr, bifentrhin and trifloxystrobin behavior. LG phos is the sample where only phosporic acid and bentonite is added to the system in addition to filtration in silica and alumina. This experiment shows us that trifloxystrobin is remove in basic solution and not in acid solution. Which is same for chlorfenapyr and bifentrhin. SM NAOH experiment where the amount of oil sample is reduce keeping the same amount of sodium hydroxide (but no phosphoric acid was added) and bentonite. SM phos experiment where only phosphoric acid was added in the hexane/oil mixture which illustrate that chlorfenapyr, bifentrhin and trifloxystrobin is highly reactive in sodium hydroxide. The following concerns Table 3. As for Table 3 this experiment were design to progressively shows how the order between acid and bases should be done. This table shows that with only bentonite, the removal is slow and not efficient, it also shows that without sodium hydroxide complete removal of trifloxystrobin is not efficient without sodium hydroxide.

0.5 ml P&B an experiment where 0.5 ml of phosphoric acid was incorporated with bentonite (no sodium hydroxide).

0.5 ml PBNB is the experiment that shows only small amount of phosphoric acid was added in the presence of bentonite and 0.5 g sodium hydroxide.

5.0 ml PBNB is the final experiment to show that this amount (given concentrate were the final operating parameter for cleaning) in the presence of phosphoric acid, sodium hydroxide and bentonite.

It should be noted that this experiment was designed as a comparative analysis between the needed phosphoric acid, bentonite and sodium hydroxide. It is there to show side by side and are done in the same day unlike table 1 and 2 where we are trying to illustrate each step effectiveness.

Bentonite Treatment in the Present Disclosure.

In the methods of the present disclosure, bentonite is not packed into a chromatography column. Instead, the bentonite is used in a batch method. The bentonite method is a batch method, in a sense that it is reacted in a solution of hex/oil mixture while mixing. This in particular is what generally is called Na predominant bentonite, but it is process with 5% of sulfuric acid is added by mass ratio. This modification allows it to interact with in a wide spectrum of ionic compounds that are in form of acids and bases. Additionally, this product was made specifically to remove tannins and its derivative (Gallic acids and Phloroglucinol). The present inventor just modified the matrix solution that will allow it to interact with pesticides (specifically to their ionized functional groups nitriles, pyrroles and azoles). Inventor's method of using 5% sulfuric acid to the bentonite in order to make the bentonite better at adsorbing ionic compounds is responsible, in part, for the improved characteristics of inventor's method.

The bentonite that is used in inventor's process compose of 5% sulfuric acid as described in the COFA of the material bentonite perform 6000 produce and distributed by Oil-Dri Corp, Chicago, Ill. COFA is an acronym that stands for certificate of analysis, Oil-Dry is the company that manufactures the bentonite.

Maintenance of pH During Bentonite Treatment.

The present disclosure provides reagents and methods to maintain a stable value for pH. The present disclosure uses phosphoric acid as the pH-modifier and buffer because it has a property of three different pKa values that can adsorb any causal pH perturbations in the system. The inventor checked the pH prior to the adsorption process to make sure that it is optimized and throughout the reaction process.

The two pH systems that the inventor is interested in are system with pH range of 2.0-2.5 and system with pH range of 12-12.3. The buffer system used in the present disclosure allows us to slightly ionized the nitrile and pyrrole groups influencing their nucleophilicity allowing them to interact with bentonite.

Relationship Between Ionizable Groups of Pesticides and pH Values of Solutions and Solvents of the Present Disclosure (Bentonite Treatment).

Our method uses the following steps that lead to the removal of pesticides. The first is water and acid water, which removes any water soluble material as we as reactive analogs. Additional steps that lead to the removal of pesticides, is the low pH wash with bentonite, then high pH was in bentonite. A basis for using these steps is as follows. All pesticide have no pKa at physiological pH between 3-12. A laboratory chemist would have to go to the extreme pH values to have these nitriles and pyrroles groups on pesticides to be ionized. Once ionized this is the best time to add the bentonite.

Advantage of Reduced Leaching (Bentonite Treatment).

The present disclosure provides the advantage of reducing leaching of pesticides from bentonite. Leaching of pesticide from clay mineral was observed in adsorption practices (from up to 2 cm thickness of the bed). The process of the present disclosure allows the pesticide to bind to the clay chemically and therefore when you separate the supernatant from the solid, the liquid (hexane) carries the cannabinoids but leaves behind the pesticide intact in the bed. This means that the efficiency of the removal increase as well as the safety of the handling of the used bentonite.

As stated above, the method results in "reducing leaching of pesticides from bentonite." The leaching statement here pertains to the ability of the bentonite to hold onto the pesticide as the user collects the supernatant. Evidence that the depth of the bed of determines the leaching of pesticide in ordinary clay.

Defining Acidic Silica Gel.

Acidic silica gel is determined or defined as the number of silanol groups exposed on the outer layer of the silica surface to interact with basic analyte. In general, silica can create a high amount of hydrogen bonding with water, these interaction are caused by these silanols. These types of alcohol are more acidic than regular alcohol groups because silicon is far less electronegative than carbon. In contrast, more silanol on the is exposed on the transition phase of the bulk will have a high acidity content.

Compositions that May Need to be Avoided.

Compositions, reagents, conditions that may need to be excluded from the reagents, systems, and methods of the present disclosure include the following. Studies have been conducted on the stability of bentonite in NaOH and HCl solution. Illites and Kaolinite would not work for the methods of the present disclosure, as the adsorption complex is destroyed in these conditions which leads to the leaching of iron oxide, alumina oxide and silicon oxide. One cannot use hydrochloric acid (HCl) on the processes of the present disclosure, because it will destroy the sodium linkage in bentonite. Water content must be minimal prior to the process.

(E) Example Five. Column Chromatography with Silica/Alumina Column Bed, for Use Following Bentonite Treatment Description of chromatograph column and of column bed used for treating with silica and alumina (this column is used after bentonite treatment). We generally used 450 g of silica and 200 g alumina in the same column (alumina is at the bottom and silica is at the top). The dimension of the column that we used is 80 mm internal diameter (i.d.) at 200 mm length. The column is made from borosilicate glass. We use a pump made by Waters (600E) which pumps solution at 25 ml/min max, all temperature are kept at room temp and the flow rate is 25 mL/min with back pressure of 510 pounds per square inch (psi). Hexane is used for eluting the column, where a microfluidic pump is used, and where the microfluidic pump can be adjusted to provide various flow rates. The column bed material can be recycled, but preferably, the column bed is not recycled and not used again. The column bed may or may not be recycled, and then used again for removing pesticides from another batch of plant matter.

The following provides a step-by-step description how all of the following things are used, and fit in together, in a preferred method and system of the present disclosure. The things are: (1) *Cannabis* plant matter (this is the source of phytocannabinoids), (2) Oil extract (this is the starting material for the process), (3) Hexane (this is the dissolving media for the process), (4) Water (to allow the cationic/anionic exchange), and (5) Acid water (pH modifier).

Step 1. Plant material devoid of phytocannabinoids using ethanol as the extraction solvent.

Step 2. Oil extract is collected once the plant material is wash with ethanol and that ethanol is rotary evaporator.

Step 3. Once the oil is devoid of ethanol it will be dissolve in hexane, hexane will be added in the ratio of 1:5 oil:hexane.

Step 4. Acid water (phosphoric acid in water) will be added in the hexane mixture to protonate amino groups of the pesticides. Then bentonite is added. 50 ml of phosphoric acid is added water then added to the solution, then a pH will be used to determine the pH (the pH has to be between steps 1-2.

Adjusting pH to Ionize Nitrite Groups and Pyrrole Groups.

For use in bentonite method or Countercurrent Partition Chromatography (CPC) method, the inventor discovered how to adjust the pH of the system in a way that allows us to slightly ionize the nitrile and pyrrole groups, allowing them to interact with the bentonite. Table 3 discloses pesticides, which can be removed by the methods of the present disclosure, where the pesticides contain a nitrile group, a pyrrole group, an azole group, an amino group, an alcohol group, or a nitrate group.

TABLE 3

List of functional groups that can be ionized, where ionization is at an extreme pH

|  | Nitrile | Pyrrole | Azole | Amino | Alcohol | Nitrate |
|---|---|---|---|---|---|---|
| fenhexamide |  |  |  | yes | yes |  |
| fenpyroximate |  |  | yes | yes |  |  |
| flonicamid | yes | yes |  | yes |  |  |
| fludooxonil | yes | yes |  |  |  |  |
| hexythiazox |  | yes |  | yes |  |  |
| imidacloprid |  | yes | yes | yes |  | yes |
| myclobutanil | yes |  | yes |  |  |  |
| paclobutrazole |  |  | yes |  | yes |  |
| propiconazole |  |  | yes |  |  |  |
| spinosad |  |  |  | yes |  |  |
| spinetoram |  |  |  | yes |  |  |
| spirotetramat |  | yes |  |  |  |  |
| tebuconazole |  |  | yes |  | yes |  |
| thiamethoxam |  | yes | yes | yes |  | yes |
| trifloxystrobin | yes |  |  |  |  | yes |
| etoxazole |  | yes |  |  |  |  |
| dimethomorph |  | yes |  |  |  |  |
| cypermetrin | yes |  |  |  |  |  |
| cyflutrin | yes |  |  |  |  |  |
| chlofenapyr | yes | yes |  |  |  |  |
| captan |  | yes |  |  |  |  |
| boscalid |  | yes |  | yes |  |  |
| bifenazate |  |  |  | yes |  |  |

By inducing the partial charges on these molecules with the aid of pH manipulation, pesticide exhibit as an ion exchangeable compound, which therefore increases their retainability in the bentonite. Furthermore, there are analytes that in extreme pH can naturally degrade, and these are the pesticides that contains esters such as bifenazate, spinosad, cypermetrin, permethrin, triofloxystrobin, cyflutrin, spirotetramat and piperonyl butoxide. Degradation by-product contains an alcohol and a carboxylic acid derivative which can be trapped in silica alumina column. Furthermore, the alcoholic derivatives can be easily distilled to remove all remnants in the oil mixture solution.

See, it is the concerted effect in each stages of the cleaning provides an additionally mechanism for removal to increase the efficiency of the remediation process. Collectively in a step-wise process, the degree of removal depends on the following hierarchy:

Esters<alcohols<carboxylic acids<nitrile<pyrrole<azole<nitrate<amino

For heterocyclic pyrroles and azoles the degree of activation depends on the degree of its ionizability which are directly correlated to the electronegativity of the atoms included in the heterocyclic ring. This refers to the electron withdrawing and electron donating capacity of those atoms which are describe in accordance to the Huckel rule.

This provides a detail regarding the above-disclosed degradation by-products. Pesticides with esters, when exposed to an extreme pH, can degrade to an alcohol derivative or to a carboxylic acid derivative. This is documented below for the example of bifenthrin (Fecko A (1999) Environmental Fate of Bifenthrin. Environmental Monitoring and Pest Management Branch, Dept. of Pesticide Regulation, Sacramento, Calif.). Bifenthrin is, (2-methyl-1-biphenyl-3-yl)-methyl-3-(2-chloro-3,3,3-trifluoro-1-propenyl)-2,2-dimethyl cyclopropanecarboxylate. The Fecko publication discloses that bifentrin can be degraded to produce, bifentrin alcohol, bifentrin acid, TFP acid, 4'-hydroxy bifentrin (hydrolysis product), and bifentrin aldehyde.

(F) Example Six. Modifying Bentonite to Improve Bentonite's Adsorption Properties The present inventor found that bentonite and secondary amines react together to form much better adsorbate bentonite (in terms polyaromatic compound as the adsorbed compounds). In the process of the present disclosure, pesticides can be the modifiers. Table 3 discloses that most pesticides do contain a derivative of secondary amines. A secondary amine takes the form: $R_1$—NH—$R_2$.

The inventor used secondary amine here as a general term that can be ionized easily meaning it could have 1-2 hydrogen bonding in the nitrogen atom. In most cases, these pesticides contains a secondary amine group in that they contain a nitrogen bounded to a hydrocarbon groups ($R_1$—N—$R_2$) $R_1$ and $R_2$ both indicate a hydrocarbon derivatives that can contain S, O, N.

In theory, most classes of secondary amine can undergo ionization process because its implied that the remaining atoms bonded to it are hydrogen. Linear configuration such that the R groups are composed of hydrocarbon and hydrocarbon moiety.

The pesticide is intentionally added to the bentonite in order to modify the bentonite. It is possible to add some other type of secondary amine (a secondary amine that is not a pesticide) in order to modify the bentonite. The above refers to secondary amines as a general term that the inventor used to illustrate pesticides as an additive to the bentonite.

Effectiveness of Extracting Pesticides.

In embodiments, the bentonite scrubbing procedure can reduce pesticide content of a *cannabis* extract, so that pesticide content (parts per million; ppm) is reduced to lower than 50% the initial value, to lower than 40%, to lower than 30%, to lower than 30%, to lower than 20%, to lower than 10%, to lower than 5%, to lower than 2%, or to lower than 1% of the initial value.

(G) Example Seven. Description of Steps in Bentonite Method

For high alkyloid content, 5 part silica and 5 part alumina was used, for high sugar content, 7 part alumina and 3 part silica was used. All media are prewashed with alcohol and water and dried under vacuum to drop water content to below 1%.

(1) Methodology:

(1.1) Reagents:

TABLE 4

Reagents for bentonite method

| REAGENT | DESCRIPTION |
|---|---|
| Phosphoric acid | Food grade 85% |
| Sodium Hydroxide | Food grade 99% in crystals |
| Ethanol | Food Grade 99% |
| Hexane | Reagent grade 99% |
| Bentonite | Na montmorillonite pH 2.5-4.5, Moisture content of not more than 15% |

TABLE 4-continued

Reagents for bentonite method

| REAGENT | DESCRIPTION |
|---|---|
| Silica Gel | 50 micron, activated |
| Alumina | 50 micron, acidic activated |
| Citric acid | Food grade 99% |
| Water | Deionized |

(1.2) Equipment:

TABLE 5

Equipment useful for bentonite method or for Countercurrent Partition Chromatography (CPC) method.

| Equipment | Description |
|---|---|
| Column Filter | 200/300 Column chromatography |
| Homogenizer | Overhead mixer with variable control |
| 5 L beaker | Borosilicate inert |
| Rotary evaporator (Rotovap) | 5.0 L rotary evaporation |
| Distillation Unit | 2 inch still (Pope Scientific, Milwaukee, WI) |
| Solid-Liquid Separator | Cole-Palmer particle separator |
| Pump System | 30 gallons per minute (gpm) with inline value for solvent velocity control |
| Counter Current partitioning Chromatography | 6.0 liters to 25 liter Cartridge, with SSI pumps to deliver 200 ml/min. fraction collector (Waters Corp., Milford, MA) |

(2) Procedure: Removal of Pesticide Via Bentonlte (2.1) Dissolve the oil in hexane at 1:4 ratio where for every 1 part oil 4 part hexane and mix to homogeneity. Once the mixture is homogenized, heat the mixture to 70 degrees C. with constant mixing. While mixing prepare a solution of citric acid diluted in water at 125 mg/ml and add it to the oil-hexane mixture. Allow it to mix for 45 min and decant the upper layer into clean-pesticide free 5.0l beaker.

(2.2) Take the oil-hexane mixture from step 3.1 and heat the mixture to 75-80 degrees C. Add 300 g dried bentonite and add 50 ml phosphoric acid dissolve in ethanol in the mixture. Allow it to mix for 50 min at vigorous and continuous mixing. Once the mixture finish mixing at the allotted time, allow the bentonite particle to separate by running this mixture in solid-liquid separator collecting the supernatant.

(2.3) To the collected mixture in step 3.2, place the solution in 5.0 L beaker and allow it to mix at 70 degrees C. temperature. Add 15 grams of sodium hydroxide dissolve in 200 mL ethanol and allow the mixture to mix for 45 min with constant mixing (Note: be sure that there is complete homogeneity in the mixture and that there is no bentonite build up in the bottom of the beaker). Once the allotted time of mixing is reach, remove the mixture from the heat and allow it to sit to separate the bentonite from the liquid mixture. Once separated, collect the supernatant and wash the bentonite solution with clean hexane and run it in the solid-liquid separator to assume high yield recovery in the process.

Details about Heating.

The goal of the heating at 70 degrees C. is for increasing absorptivity of bentonite (the goal of this heating is not to decarboxylate cannabinoid acids). Heating is for one minute for the mixture of bentonite and phosphoric acid. Also, heating is for one minutes for the mixture of bentonite and sodium hydroxide. Regarding the step of making the mixture of bentonite and phosphoric acid, followed by the step of making the mixture of bentonite and sodium hydroxide, there is not any washing step conducted between these two steps. All excess base in the hexane/oil mixture gets trapped in the silica/alumina bed. Unless specified otherwise, all steps in the methods of the present disclosure and all solutions, oils, suspensions, and slurries of the present disclosure are at room temperature (about 23 degrees C.), unless the context dictates that another temperature is the correct temperature. For example, for a solution that is held at 70 degrees, the skilled artisan understands that there will be a series continuous (or stepwise) escalating temperatures when a room temperature is warmed to 70 degrees, and that there will be a series of continuous or stepwise decreasing temperatures, when a solution at 70 degrees is allowed to cool (or actively cooled) to room temperature.

(2.4) Prepare a silica and alumina column. Place 200 g of activated alumina in the column dissolve in hexane and allow the alumina to settle in the bottom of the column, once the alumina settled, add 450 grams of silica in the column dissolve in hexane and allow it to settle.

(2.5) Load the solution collected in step 3.3 in the column and allow it to elute. This is process is a continuous process.

The process is continuous because the pesticide residues to be removed are in their basic form (by raising the pH of the solution in step 3.3) you are allowing the unreacted pesticide to get trap in the column irreversibly. In this process, the activated acidic alumina will adsorb the pesticides efficiently.

(2.6) Collect the eluted solution of oil and hexane and separate the hexane via rotary evaporator and prepare the collected oil for distillation. Distill and collect the oil.

Secondary amines interact with bentonite via ionic-exchange mechanisms. They interact by displacing the sodium ion from the silicon-alumina matrix accruing an ionic bond between the bentonite and the amines. This process can be aided by fully activating the amine to their salt form to get an efficient adsorption (modification of bentonite via ammonium salts to increase its adsorption capacity to for phenolics and biphenolics uptake in water and oil mixtures). Furthermore, tertiary amines can also be converted to their salt form by exposing them to strong acids and thereby increasing their capacity to undergo ionic exchange mechanism with bentonite.

The Control Test.

This concerns the "control." The label control is to indicate the concentration of pesticide from the starting material. This essentially means that our initial samples contains 100 ppm of pesticide and see determine which pesticides were remove and by how much. I used 100 ppm to be able to determine the percent efficiency of the removal for all pesticide and see if I can get an understanding as why and how can I improve the method later on. This concerns "Method 1," "Method 2," and "Method 3." All these three methods were unique from each other and differ from each other in terms of pH. Method 3 was done with pH 4, Method 2 was done with pH 2 and Method 1 was done only with deionized water (roughly around 7.2). This will illustrate how pesticide behave in in increasing pH so that for later method validation can pave the way for easy adjustment. The step-by-step is very simple and it goes as (1) dissolve the sample in heptane and degas it, load the stationary phase (aqueous phase in this case). Equilibrate the system with the mobile phase (organic) and inject the sample once it's ready. When the elution is complete collect the faction of sample and dry the material. Now the pH modification is applied in the stationary phase (aqueous solution) and we modified it using phosphoric acid (best choice in terms of stability and its ability to restraint change).

(H) Example Eight. Pesticides that can be Removed by the Bentonite

Our results suggest varying degree of reactivity between heterocyclic amines and aliphatic amines were collected. Table 6 provides a list of pesticides that can be removed by this process.

TABLE 6

Pesticides that can be removed by bentonite treatment followed by processing with a silica and alumina column

| | | |
|---|---|---|
| Abamectin | Diaminozide | Myclobutanil |
| Aldicarb | Diazinon | Paclobutrazole (Bonzi) |
| Azoxystrobin | Etoxazole | Piperonyl butoxide |
| Bifenthrin | Fenhexamide | Pyrethrins |
| Bifenazate | Flonicamid | Spinosad |
| Boscalid | Fenoxycarb | Spiromesifen |
| Carbaryl | Hexythiazox | Spirotetramat |
| Captan | Imidacloprid | Trifloxystrobin |
| Cypermetrin | Malathion | Tebuconazole |
| | | Thiametoxam |

Note that Bifenthrin and also Cypermetrin are in the list of Table 6 and the list of Table 7, that is, in the big list of 28 pesticides, and the small list of 5 pesticides. The lists are for two different process, there is the physical scrubbing process via bentonite, and the second is Counter Current Partition (CPC) which is a liquid-liquid separation of the analyte in oil matrix. These process can be used independently of each other to remove pesticides.

TABLE 7

Pesticides that can be removed by bentonite treatment followed by processing with a silica and alumina column, but that requires high dosage and usually 2 passes depending on the amount of pesticide in the mixture

| | | |
|---|---|---|
| Bifenthrin | Chlorpyrifos | Permetrin |
| Chlorfenapyr | Cypermetrin | |

Note that Bifenthrin and also Cypermetrin are in the list of Table 1 and the list of Table 2, that is in the big list of 28 pesticides, and the small list of 5 pesticides. The lists are for two different process, there is the physical scrubbing process via bentonite, and the second is Counter Current Partition (CPC) which is a liquid-liquid separation of the analyte in oil matrix. These process can be used independently of each other to remove pesticides.

There are other pesticides that can be removed with this process, but where the process requires high dosage and usually two passes depending on the amount of pesticide in the mixture. These residues are listed in the tables. In general, these are the only pesticide that we tested it on as these are the main pesticide that are commonly found in our process. However, keeping in mind a pesticide with ionizable property can undergo in this process and can be remove examples of these are Daminozide, Dichlorvos, Oxamil and Methiocarb. These pesticides are not found in our process but can be in other oil mixtures.

Activating the Secondary Amine of a Pesticide by Adjusting the pH of Medium or Buffer.

For use in steps of extraction, chromatography, separation steps involving beads, resins, powders, or separation steps involving liquid medica such as Countercurrent Partition Chromatography (CPC), what is provided is increasing the efficiency of the method by fully activating the amino to their salt form to get an efficient absorption. This refers to the following. This concerns pesticides that have a moiety that takes the form of a secondary amine. At neutral pH, the secondary amine can take the form that is not protonated and not ionized, such as the following: $R_1$—NH—$R_2$. The present CPC method activates this non-protonated secondary amine, so that it takes a form, $R_1$—NH—$R_2$ where the lone pair of electrons on the nitrogen binds a proton ($H^+$). Alternatively, the present CPC method activates this non-protonated secondary amine so that the lone pair of electrons on the nitrogen binds a sodium atom ($Na^+$).

Some pesticides are ionized when the medium has a high pH and some are ionized when the medium has a low pH. This process is dictated by the pKa of the pesticide, meaning that one can generate the proper pH strength to force an ionizable condition (an ionizable condition taking the form of an anion or cation).

Further Features of Bentonite Method.

The system, reagents, and methods of the present disclosure include bentonite chemoadsorption using modified Na-montmorillonite. With pH value between 2.5-4.5, chemoadsorption mechanism dominates. Moisture content requirement of not greater than 15.0% and particle size of 325 US mesh.

The system, reagents, and methods of the present disclosure include, between the range of 200 g to 400 g (20 to 30% dosing depending on the quality of the oil mixture) pre-dried bentonite is used for every 4000 ml to 5000 ml hexane preprocess oil mixture in a beaker.

The system, reagents, and methods of the present disclosure include temperatures between 70 C to 90 C, these chemical reaction must undergo elevated temperature to undergo complete ionizability and adsorption.

The system, reagents, and methods of the present disclosure include addition of inorganic acids and bases in the bentonite-oil mixture for chemical reaction was employed.

The system, reagents, and methods of the present disclosure encompass bases and acids are dissolve in small amount of alcohol, Depending on the amount of acids and bases used, different alcohol holds various efficiency for proper pH homogeneity and reactivity. Alcohol have effect on reactivity of the pesticide with bentonite.

Composition of alumina and silica. The following composition were facilitated in the processing method, high tannin value oil, used 6 part silica and 4 part alumina. Note that both media are low pH value and with a porosity of not more than 50 microns.

This measurements are based on the mean size of the pore (which is usually tested on NIST sieve of 325). Both alumina and silica are tested the same in terms of porosity. Since we are using flash grade silica and alumina, the general requirement is 50 microns.

The system, reagents, and methods of the present disclosure includes solvent system composition 6 part aliphatic alkane, 3 part alcohol and 1 part water at 2.0 pH The system, reagents, and methods of the present disclosure encompasses a solvent system composition 6 part aliphatic alkane, 2 part alcohol and 2 part water at pH 2.0

The system, reagents, and methods of the present disclosure also comprises solvent system composition 6 part aliphatic alkane, 3 part alcohol, 1 part water.

The system, reagents, and methods of the present disclosure uses a stationary pH that was adjusted to 2.0 using inorganic acid and bases such as hydrochloric acid, phosphoric acid, nitric acid and citric acid, sodium hydroxide and potassium hydroxide depending on the saponification and acid value of the material.

The system, reagents, and methods of the present disclosure include alcohol compositions, such as propanol, ethanol, methanol, isopropanol butanol depending on the viscosity, peroxide value and APHA value of the starting material.

The system, reagents, and methods of the present disclosure encompass aliphatic hydrocarbons used in the process, for example, pentane, hexane and heptane, depending on the sugar and phenol content of the starting material.

The system, reagents, and methods of the present disclosure include additives such as ethyl acetate and acetonitrile in the presence of selected pyrethrins.

Exemplary Method for Removing Sugar.

The present disclosure provides the following method for removing sugar from an oil matrix. Overall, the method comprises the steps of: (a) Dissolving the oil matrix, (b) Cooling the oil matrix to about minus 50 degrees C., (c) Filtering and collecting the filtered material which is herein called a supernatant, (d) Alkalizing the supernatant and allowing phases to develop where the developed phases include an organic phase, (e) Separating the phases, (f) A phase collection step that collects the organic hexane phase, (g) Repeating at least once the phase separation step, (h) Adding bentonite to the organic phase followed by collecting the hexane layer, (i) The step of separating the hexane from the distillate oil, (j) The step of distillation to remove any residual hexane.

In detail, the method comprises the steps of: (a) The step of dissolving the oil matrix that contained sugar in hexane to homogeneity, (b) A cryofreezer step, where once the oil matrix is dissolved, the step of placing the hexane/oil mixture in the cryofreezer to reach temperature of −50.0 C, (c) A filtering step, where once the desired temperature is reached, filter the mixture through Buchner funnel an collect the supernatant, (d) An alkalinization step, where to the supernatant, add 5.0M sodium hydroxide dissolved in water, and allow to mix for 45 minutes at 2.5 kg of oil unit, (e) A separation step, that allows the phases to separate and collect the organic phase of the mixture, (f) A phase separation step, that collects the organic phase of the mixture, (g) A repeat of the phase separation step for a total of three times of carrying out the phase separation step, with collection of all of the supernatants, (h) A bentonite addition step, where to the organic phase, add 300 grams of bentonite and collect the hexane layer, (i) A hexane separation step, where hexane is separated from the distillate oil, and (j) A distillation step that distills the oil to remove any residual hexane.

(I) Example Nine. Demonstration of Removal of Various Pesticides at Each Step in a Multistep Procedure FIG. 1 provides a table showing removal of various pesticides at each step in a multistep procedure of the present disclosure. The results provide an experiment where the successive steps were analyzed. Step 1 the starting material stage, Step 2, the filtration of material with just the alumina and silica. Initially, the inventor was going to do use a process only up to Step 2, but then the inventor discovered that it only remove one of the tested pesticides (myclobutanil). For this reason, the inventor added the bentonite and ionizables in the succession. Step 3 this is where the bentonite, phosphoric acid and sodium hydroxide were added. Initially we were just ionizing the solution of hexane/oil and filtering it then bentonite came about. Then Step 4 is when heating was added in the mixture, this was part of the functionalization of bentonite allowing to adsorb ionizable amine functional groups into the bentonite via ionic exchange mechanism (FIG. 1).

Results of the experiment setup (FIG. 1) to illustrate the efficiency of the removal of pesticide in each step of the process. It also illustrates how ionization of solution (functionalization of the bentonite) using phosphoric acid and sodium hydroxide. It should be noted that GSC2 sample is a sample acquired through our plant material source which contains significant amount of pesticide. In general process, the main pesticide concern here are Myclobutanil, paclobutrazole, etoxazole, permethrin, piperonyl butoxide, trifloxystrobin, bifenazate and boscalid since they are the kind of pesticide that are found in plant material here in Los Angeles, Calif. area. It should be noted that this sample when through extraction and distillation (2×) to generate this sample.

These is the confirmation to validate the removal method, data were collected in a service of experiment to show how each major steps in the process contribute to the efficiency of the removal of pesticide. It should be noted that the general schematic or the pesticide removal method is as follows:

(1) Homogenizing the distillate oil mixture in the hexane solution (2) Ionizing the solution with phosphoric acid and the addition bentonite (3) Ionizing the solution with sodium hydroxide and the addition of bentonite (4) Filtration of the hexane/oil mixture (5) Final distillation process to remove hexane from the oil Though the steps in FIG. 1 shows in reverse of the steps shown immediately above, this is just to illustrate the efficiency of the removal of the pesticide going from filtration with alumina and silica, processing with bentonite, phosphoric acid and sodium hydroxide and finally the process of adding the heat in the process to further expand the type of pesticide the process can remove. Grayed out cells in FIG. 1 indicate that the pesticide residue was not detected on the sample. Please refer to FIG. 1, the table that appears in this figure illustrates how each step are associated to the removal of pesticide. Alumina only remove myclobutanil efficiently the rest are not removed. There are some removal of tebuconazole, otherwise it all stayed the same.

This concerns FIG. 3. It is the presence of the acids and bases that allows the efficient removal of pesticide. FIG. 3 provides data is that the inventor collected to illustrate that mechanism. The amount of bentonite used in this process is consistent to 20% of the total volume of solution (or suspension), sodium hydroxide used also at 3.0 g/20 g sample.

The amount of bentonite can be about 5%, about 10%, about 15%, about 20%, about 25%, about 30%, about 35%, about 40%, of the total volume of a solution or suspension (amount of bentonite by weight, amount of solution by weight). Also, the amount of bentonite can be about 5%, about 10%, about 15%, about 20%, about 25%, about 30%, about 35%, about 40%, of the total volume of a solution (or suspension)

In range embodiments, the amount of bentonite can be about 5%-10%, 15%-20%, 25%-30%, about 35%-40%, of the total volume of a solution or suspension (amount of bentonite by weight, amount of solution by weight). Also, the amount of bentonite can be 5%-10%, 10%-15%, 15%-20%, 20%-25%, 25%-30%, 30%-35%, 35%-40%, of the total volume of a solution (or suspension).

Bifenazate as it is one of the most common pesticide that comes along in the plant material. FIG. 3 indicate that simple addition of bentonite does not remove the pesticide residues, acid and base needs to be added to increase the efficiency of the removal, let consider bifenazate, the standard contains 0.32 ppm (mg/kg) and when the bentonite is added it yielded roughly the same amount, furthermore upon the optimization experiment of the process, we found that the concentration of phosphoric acid requires it at higher concentration (excess amount) to facilitate the remove, (0.5 ml P&B means that on that process, 0.5 ml of phosphoric acid was added which is then followed by bentonite scrubbing) and only when sodium hydroxide is added that a full removal which is indicated by 0.5 ml PBNB (a statement indicating that Phosphoric acid-Bentonite then sodium hydroxide-Bentonite process was used), further illustration that a 5.0 ml phosphoric acid (20 g sample) was more efficient than that of a 0.5 ml volume. Additionally, myclobutanil (one of the most common pesticide in our process) can be remove efficiently where a starting material of 3.4 ppm (mg/kg) was cleaned as soon as the phosphoric acid was added, the pesticide residue was cleaned. This is a very effective way of removing myclobutanil, paclobutrazole, permetrin, piperonyl butoxide, propiconazole, tebuconazole, trifloxystrobin, bifenzate, boscalid, and, etoxazole, furthermore, bifentrin can be remove and it just depends on the dosage of bentonite to be used in this experiment 10-20%/bentonite was used.

Two-Step Procedure.

During the 2-step procedure involving first, mixing bentonite with phosphoric acid, and second, mixing bentonite with sodium hydroxide, it is the case that during this entire process the matrix takes the form of oil/hexane at a 1:3 ratio (vol./vol.). Between the first step and the second step, the inventors simply allow the bentonite to settle to the bottom of the beaker. Then, the supernatant is collected and used the second step, where it is mixed with a fresh batch of bentonite plus the sodium hydroxide. In a preferred embodiment, the step with bentonite with phosphoric acid is performed first, and the step with bentonite with sodium hydroxide is performed second, in order to avoid "soaping" while doing the sodium hydroxide plus bentonite scrubbing the second step.

Exclusionary Embodiments Regarding the Two-Step Procedure.

In an exclusionary embodiment, the present disclosure can exclude any pesticide removal procedure that does not involve both the bentonite with phosphoric acid mixing step and the bentonite with sodium hydroxide mixing step. Also, in an exclusionary embodiment, the present disclosure can exclude any pesticide removal procedure that involves bentonite with phosphoric acid mixing and bentonite plus sodium hydroxide mixing, but where the bentonite plus sodium hydroxide mixing is performed before the bentonite with phosphoric acid mixing.

Sodium Hydroxide Embodiments.

In mixing embodiments, what can be mixed is sodium hydroxide (NaOH) and oil extract with bentonite, where the amounts of NaOH and oil extract are used in a ratio defined by one of the following amounts. Also, the amounts of NaOH and oil extract can actually occur in one of the following amounts. The ratios or, alternatively the state amount that is actually used, include 3.0 grams NaOH/200 grams extract oil, 3.0 grams NaOH/180 grams extract oil, 3.0 grams NaOH/160 grams extract oil, 3.0 grams NaOH/140 grams extract oil, 3.0 grams NaOH/120 grams extract oil, 3.0 grams NaOH/100 grams extract oil, 3.0 grams NaOH/80 grams extract oil, 3.0 grams NaOH/60 grams extract oil, 3.0 grams NaOH/50 grams extract oil, 3.0 grams NaOH/40 grams extract oil, 3.0 grams NaOH/30 grams extract oil, 3.0 grams NaOH/20 grams extract oil, 3.0 grams NaOH/10 grams extract oil, and so on. Range embodiments are provided for the above ratios and for the above actual amounts, where the range takes the form of the a range between any two of the above-disclosed values.

In "about" embodiments, the present disclosure provides systems, compositions, and methods that encompass ratios or, alternatively the stated amount that is actually used, include about 3.0 grams NaOH/200 grams extract oil, about 3.0 grams NaOH/180 grams extract oil, about 3.0 grams NaOH/160 grams extract oil, about 3.0 grams NaOH/140 grams extract oil, about 3.0 grams NaOH/120 grams extract oil, about 3.0 grams NaOH/100 grams extract oil, about 3.0 grams NaOH/80 grams extract oil, about 3.0 grams NaOH/60 grams extract oil, about 3.0 grams NaOH/50 grams extract oil, about 3.0 grams NaOH/40 grams extract oil, about 3.0 grams NaOH/30 grams extract oil, about 3.0 grams NaOH/20 grams extract oil, about 3.0 grams NaOH/10 grams extract oil, and so on. Range embodiments are provided for the above ratios and for the above actual amounts, where the range takes the form of the a range between any two of the above-disclosed values.

Potassium Hydroxide Embodiments.

In embodiments relating to mixing, systems, compositions, and methods, what can be mixed is potassium hydroxide (KOH) and oil extract with bentonite, where the amounts of KOH and oil extract are used in a ratio defined by one of the following amounts. Also, the amounts of KOH and oil extract can actually occur in one of the following amounts. The ratios or, alternatively the state amount that is actually used, include 3.0 grams KOH/200 grams extract oil, 3.0 grams KOH/180 grams extract oil, 3.0 grams KOH/160 grams extract oil, 3.0 grams KOH/140 grams extract oil, 3.0 grams KOH/120 grams extract oil, 3.0 grams KOH/100 grams extract oil, 3.0 grams KOH/80 grams extract oil, 3.0 grams KOH/60 grams extract oil, 3.0 grams KOH/50 grams extract oil, 3.0 grams KOH/40 grams extract oil, 3.0 grams KOH/30 grams extract oil, 3.0 grams KOH/20 grams extract oil, 3.0 grams KOH/10 grams extract oil, and so on. Range embodiments are provided for the above ratios and for the above actual amounts, where the range takes the form of the a range between any two of the above-disclosed values.

In "about" embodiments, the present disclosure provides mixing embodiments, and embodiments relating to systems, compositions, and methods that encompass ratios or, alternatively the stated amount that is actually used, include about 3.0 grams KOH/200 grams extract oil, about 3.0 grams KOH/180 grams extract oil, about 3.0 grams KOH/160 grams extract oil, about 3.0 grams KOH/140 grams extract oil, about 3.0 grams KOH/120 grams extract oil, about 3.0 grams KOH/100 grams extract oil, about 3.0 grams KOH/80 grams extract oil, about 3.0 grams KOH/60 grams extract oil, about 3.0 grams KOH/50 grams extract oil, about 3.0 grams KOH/40 grams extract oil, about 3.0 grams KOH/30 grams extract oil, about 3.0 grams KOH/20 grams extract oil, about 3.0 grams KOH/10 grams extract oil, and so on. Range embodiments are provided for the above ratios and for the above actual amounts, where the range takes the form of the a range between any two of the above-disclosed values.

Mixtures of Sodium Hydroxide and Potassium Hydroxide.

The above systems, compositions, reagents, and methods encompass mixtures of sodium hydroxide and potassium hydroxide. What is provided are the values, "about values," and ranges that are disclosed above, except where NaOH is replaced by "sum of weight of NaOH and KOH."

Abbreviations and Other Details Relating to FIG. 3.

"P & B" represent the process in which the sample undergone, P stands for phosphoric acid was added and mixed in bentonite. "PBNB" refers to a process where phosphoric acid was added in the presence of bentonite and sodium hydroxide was added in the presence of bentonite. It should be noted that in each step there is a homogenization period, from when the phosphoric acid is added and the bentonite is added (same for sodium hydroxide) this allows the pesticide to be ionized prior to adding the bentonite. This concerns the 0.5 ml of PBNB that is added. 0.5 ml refers to the amount of phosphoric acid added in the sample and undergone the process as stated above. This concerns the 5.0 ml PBNB that is added. 5.0 ml is the volume of phosphoric acid was added, see in the beginning of the method development, the inventor hypothesized that phosphoric acid is pulling some of the phosphatides present in the extract which is why the removal of the pesticide is not very efficient as some of the phosphoric acid that the inventor added are reacting to something, so the inventor change the amount from 0.5 ml to 5.0 ml and that did the trick. And this proved to be right, the cloudiness in the hexane/oil mixture cleared up after the addition of the additional phosphoric acid.

Exclusionary Embodiments

In embodiments relating to solvents, the present disclosure can exclude any reagent, solution, composition, method, or system that comprises one or more of petroleum ether, hexane, cyclohexane, toluene, methyl tert-butyl ether, tetrahydrofuran, diethyl ether, ethyl acetate, chloroform, acetone, DMSO, acetonitrile, isopropyl alcohol, n-propanol, n-butanol, acetic acid, ethanol, methanol, water, octane, octanol, a biphasic solvent, a triphasic solvent, or a tetraphasic solvent. Also, the present disclosure can exclude any solution (such as a mixture of two or more solvents) that comprises greater than 5%, greater than 10%, greater than 15%, greater than 20%, greater than 25%, greater than 30%, greater than 40%, greater than 50%, greater than 60%, greater than 70%, greater than 80%, greater than 90%, or greater than 95% of any of the above chemicals, by volume In other exclusionary embodiments, the preset disclosure can exclude any solution that comprises less than 5%, less than 10%, less than 15%, less than 20%, less than 25%, less than 30%, less than 40%, less than 50%, less than 60%, less than 70%, less than 80%, less than 90%, or less than 95% of any of the above chemicals, by volume.

Carriers and Devices for Storing and Delivery.

The present disclosure encompasses oils that have been reduced pesticide levels, in combination with a device for storing or delivery. The present disclosure provides compositions, formulations, solutions, and the like, capable of use with an electronic cigarette (e-cigarette). Apparatus and formulations for e-cigarettes are available. See, U.S. Pat. No. 9,254,002 of Chong and U.S. Pat. No. 8,997,753 of Li, which are incorporated herein in their entirety. The present disclosure further provides compositions for use in lozenges (see, Meghan Emily Keck (2015) Tribological and Thermodynamic Analysis of Lozenge Decay During Oral Processing. Master's Thesis, North Carolina State Univ). Provided are incense burners or vaporizers, perfume burners or vaporizers, in combination with the oils of the present disclosure. Provided are the oils of the present disclosure in combination with a carrier, resulting in a perfume, incense, a cosmetic, a moisturizer, emollient, toiletry, a lozenge, a candy, an inhalable powder, an inhalable mist, and inhalable vapor, and so on. Carriers include hydrogels, alginates, starches, cellulose, carboxymethylcellulose, carrageenan, sucrose, corn syrup, and combinations thereof.

The present invention is not to be limited by compositions, reagents, methods, diagnostics, laboratory data, and the like, of the present disclosure. Also, the present invention is not to be limited by any preferred embodiments that are disclosed herein.

What is claimed is:

1. A method for removing one or more pesticides from an oil, extract of *cannabis* plant matter, wherein said oil extract is produced by solvent extraction wherein the solvent is hexane, heptane, ethanol, butane, carbon dioxide, or acetone and hexane,
    the method comprising the step of extracting the *cannabis* plant matter to produce an oil extract, the step of filtering the extract with alumina and silica to produce a filtrate, the step of mixing the filtrate with one or both of (1) A suspension of bentonite in phosphoric acid, and (2) A suspension of bentonite in sodium hydroxide (NaOH), wherein the suspension has a volume.

2. The method of claim 1, comprising a first step of mixing with a suspension of bentonite in phosphoric acid and also comprising a second step of mixing with a suspension of bentonite in sodium hydroxide, and wherein the first step is performed before the second step.

3. The method of claim 1, wherein the plant matter comprises *Cannabis sativa*.

4. The method of claim 1, wherein the extracting of the plant matter is with one or more of hexane solvent, butane solvent, ethanol, solvent, carbon dioxide, and high pressure.

5. The method of claim 1, wherein the phosphoric acid is added at amount that is 5 mL phosphoric acid/50 grams extract ("LG") and wherein the sodium hydroxide is added at an amount that is 3.0 grams NaOH/50 grams extract ("LG").

6. The method of claim 1, wherein the phosphoric acid is added at an amount that is 5 mL phosphoric acid/20 grams extract ("SM") and wherein the sodium hydroxide is added at an amount that is 3.0 grams NaOH/20 grams extract).

7. The method of claim 1, wherein the oil extract contains residual solvent, the method comprising the step of distilling to remove the residual solvent from the oil extract.

8. The method of claim 1, wherein the phosphoric acid takes the form of a phosphoric acid solution, and wherein the sodium hydroxide takes the form of a sodium hydroxide solution, wherein the weight of bentonite, as measurable prior to adding and mixing bentonite, is about 20% of the weight of the total weight of the suspension of bentonite and phosphoric acid solution, or is about 20% of the weight of the total weight of the suspension of bentonite and sodium hydroxide solution.

9. The method of claim 1, wherein the suspension of filtrate with bentonite and sodium hydroxide is held at about 70 degrees for about one minute.

10. The method of claim 1, wherein the suspension of filtrate with bentonite and phosphoric acid is held at about 70 degrees for about one minute.

* * * * *